(12) United States Patent
Lee et al.

(10) Patent No.: US 7,134,934 B2
(45) Date of Patent: Nov. 14, 2006

(54) METHODS AND APPARATUS FOR ELECTRICALLY DETECTING CHARACTERISTICS OF A MICROELECTRONIC SUBSTRATE AND/OR POLISHING MEDIUM

(75) Inventors: Whonchee Lee, Boise, ID (US); Scott E. Moore, Meridian, ID (US); Scott G. Meikle, Gainesville, VA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/230,972

(22) Filed: Aug. 29, 2002

(65) Prior Publication Data

US 2003/0109198 A1 Jun. 12, 2003

Related U.S. Application Data

(63) Continuation-in-part of application No. 09/888,084, filed on Jun. 21, 2001, and a continuation-in-part of application No. 09/888,002, filed on Jun. 21, 2001, and a continuation-in-part of application No. 09/887,767, filed on Jun. 21, 2001, and a continuation-in-part of application No. 09/651,779, filed on Aug. 30, 2000.

(51) Int. Cl.
*B24B 49/00* (2006.01)

(52) U.S. Cl. ............................................. 451/8; 451/41
(58) Field of Classification Search .................. 451/41, 451/6, 8, 9; 438/692, 693
See application file for complete search history.

(56) References Cited

U.S. PATENT DOCUMENTS

| | | |
|---|---|---|
| 2,315,695 A | 4/1943 | Faust |
| 2,516,105 A | 7/1950 | der Mateosian |
| 3,239,439 A | 3/1966 | Helmke |
| 3,334,210 A | 8/1967 | Williams et al. |
| 4,839,005 A | 6/1989 | Katsumoto et al. |
| 5,098,533 A | 3/1992 | Duke et al. |
| 5,162,248 A | 11/1992 | Dennison et al. |
| 5,244,534 A | 9/1993 | Yu et al. |
| 5,300,155 A | 4/1994 | Sandhu et al. |
| 5,344,539 A | 9/1994 | Shinogi et al. |
| 5,562,529 A | 10/1996 | Kishii et al. |
| 5,567,300 A | 10/1996 | Datta et al. |
| 5,575,885 A | 11/1996 | Hirabayashi et al. |
| 5,618,381 A | 4/1997 | Doan et al. |

(Continued)

FOREIGN PATENT DOCUMENTS

EP 0459397 A2 A3 12/1991

(Continued)

OTHER PUBLICATIONS

PCT International Search Report dated Dec. 1, 2003 for PCT/US03/27181 filed Aug. 27, 2003 (7 pages).

(Continued)

*Primary Examiner*—Dung Van Nguyen
(74) *Attorney, Agent, or Firm*—Perkins Coie LLP

(57) ABSTRACT

Methods and apparatuses for detecting characteristics of a microelectronic substrate. A method in accordance with an embodiment of the invention includes positioning the microelectronic substrate proximate to and spaced apart from the first and second spaced apart electrodes, contacting the microelectronic substrate with a polishing surface of a polishing medium, removing conductive material from the microelectronic substrate by moving the substrate and/or the electrodes relative to each other while passing a variable electrical signal through the electrodes and the substrate, and detecting a change in the variable electrical signal or a supplemental electrical signal passing through the microelectronic substrate. The rate at which material is removed from the microelectronic substrate can be changed based at least in part on the change in the electrical signal.

38 Claims, 13 Drawing Sheets

U.S. PATENT DOCUMENTS

| | | |
|---|---|---|
| 5,624,300 A | 4/1997 | Kishi et al. |
| 5,676,587 A | 10/1997 | Landers et al. |
| 5,681,423 A | 10/1997 | Sandhu et al. |
| 5,780,358 A | 7/1998 | Zhou et al. |
| 5,807,165 A | 9/1998 | Uzoh et al. |
| 5,840,629 A | 11/1998 | Carpio |
| 5,843,818 A | 12/1998 | Joo et al. |
| 5,846,398 A | 12/1998 | Carpio |
| 5,863,307 A | 1/1999 | Zhou et al. |
| 5,888,866 A | 3/1999 | Chien |
| 5,897,375 A | 4/1999 | Watts et al. |
| 5,911,619 A | 6/1999 | Uzoh et al. |
| 5,930,699 A | 7/1999 | Bhatia |
| 5,934,980 A | 8/1999 | Koos et al. |
| 5,952,687 A | 9/1999 | Kawakubo et al. |
| 5,954,975 A | 9/1999 | Cadien et al. |
| 5,954,997 A | 9/1999 | Kaufman et al. |
| 5,972,792 A | 10/1999 | Hudson |
| 5,993,637 A | 11/1999 | Hisamatsu et al. |
| 6,001,730 A | 12/1999 | Farkas et al. |
| 6,007,695 A | 12/1999 | Knall et al. |
| 6,010,964 A | 1/2000 | Glass |
| 6,024,856 A | 2/2000 | Haydu et al. |
| 6,033,953 A | 3/2000 | Aoki et al. |
| 6,039,633 A | 3/2000 | Chopra |
| 6,046,099 A | 4/2000 | Cadien et al. |
| 6,051,496 A | 4/2000 | Jang |
| 6,060,386 A | 5/2000 | Givens |
| 6,060,395 A | 5/2000 | Skrovan et al. |
| 6,063,306 A | 5/2000 | Kaufman et al. |
| 6,066,030 A | 5/2000 | Uzoh |
| 6,066,559 A | 5/2000 | Gonzalez et al. |
| 6,068,787 A | 5/2000 | Grumbine et al. |
| 6,083,840 A | 7/2000 | Mravic et al. |
| 6,100,197 A | 8/2000 | Hasegawa |
| 6,103,096 A | 8/2000 | Datta et al. |
| 6,103,628 A | 8/2000 | Talieh |
| 6,103,636 A | 8/2000 | Zahorik et al. |
| 6,115,233 A | 9/2000 | Seliskar et al. |
| 6,117,781 A | 9/2000 | Lukanc et al. |
| 6,121,152 A | 9/2000 | Adams et al. |
| 6,132,586 A | 10/2000 | Adams et al. |
| 6,143,155 A | 11/2000 | Adams et al. |
| 6,162,681 A | 12/2000 | Wu |
| 6,171,467 B1 | 1/2001 | Weihs et al. |
| 6,174,425 B1 | 1/2001 | Simpson et al. |
| 6,176,992 B1 | 1/2001 | Talieh |
| 6,180,947 B1 | 1/2001 | Stickel et al. |
| 6,187,651 B1 | 2/2001 | Oh |
| 6,190,494 B1 * | 2/2001 | Dow .................... 156/345.13 |
| 6,196,899 B1 | 3/2001 | Chopra et al. |
| 6,197,182 B1 | 3/2001 | Kaufman et al. |
| 6,206,756 B1 | 3/2001 | Chopra et al. |
| 6,218,309 B1 | 4/2001 | Miller et al. |
| 6,250,994 B1 | 6/2001 | Chopra et al. |
| 6,259,128 B1 | 7/2001 | Adler et al. |
| 6,273,786 B1 | 8/2001 | Chopra et al. |
| 6,276,996 B1 | 8/2001 | Chopra |
| 6,280,581 B1 | 8/2001 | Cheng |
| 6,287,974 B1 | 9/2001 | Miller |
| 6,299,741 B1 | 10/2001 | Sun et al. |
| 6,303,956 B1 | 10/2001 | Sandhu et al. |
| 6,313,038 B1 | 11/2001 | Chopra et al. |
| 6,322,422 B1 * | 11/2001 | Satou ............................ 451/8 |
| 6,328,632 B1 | 12/2001 | Chopra |
| 6,368,184 B1 * | 4/2002 | Beckage ........................ 451/9 |
| 6,368,190 B1 | 4/2002 | Easter et al. |
| 6,379,223 B1 | 4/2002 | Sun et al. |
| 6,395,607 B1 | 5/2002 | Chung |
| 6,416,647 B1 | 7/2002 | Dordi et al. |
| 6,455,370 B1 | 9/2002 | Lane |
| 6,461,911 B1 | 10/2002 | Ahn et al. |
| 6,464,855 B1 | 10/2002 | Chadda et al. |
| 6,504,247 B1 | 1/2003 | Chung |
| 6,620,037 B1 | 9/2003 | Kaufman et al. |
| 6,689,258 B1 | 2/2004 | Lansford et al. |
| 6,693,036 B1 | 2/2004 | Nogami et al. |
| 6,722,942 B1 | 4/2004 | Lansford et al. |
| 6,722,950 B1 | 4/2004 | Dabral et al. |
| 6,736,952 B1 | 5/2004 | Emesh et al. |
| 6,753,250 B1 | 6/2004 | Hill et al. |
| 6,776,693 B1 | 8/2004 | Duboust et al. |
| 6,780,772 B1 | 8/2004 | Uzoh et al. |
| 6,846,227 B1 | 1/2005 | Sato et al. |
| 6,848,970 B1 | 2/2005 | Manens et al. |
| 6,852,630 B1 | 2/2005 | Basol et al. |
| 6,867,136 B1 | 3/2005 | Basol et al. |
| 6,881,664 B1 | 4/2005 | Catabay et al. |
| 6,893,328 B1 | 5/2005 | So |
| 2001/0025976 A1 | 10/2001 | Lee |
| 2001/0036746 A1 | 11/2001 | Sato et al. |
| 2002/0025759 A1 | 2/2002 | Lee et al. |
| 2002/0025760 A1 | 2/2002 | Lee et al. |
| 2002/0025763 A1 | 2/2002 | Lee et al. |
| 2002/0052126 A1 | 5/2002 | Lee et al. |
| 2002/0070126 A1 | 6/2002 | Sato et al. |
| 2002/0104764 A1 | 8/2002 | Banerjee et al. |
| 2002/0115283 A1 | 8/2002 | Ho et al. |
| 2003/0064669 A1 | 4/2003 | Basol et al. |
| 2003/0178320 A1 | 9/2003 | Liu et al. |
| 2004/0192052 A1 | 9/2004 | Mukherjee et al. |
| 2004/0259479 A1 | 12/2004 | Sevilla |
| 2005/0133379 A1 | 6/2005 | Basol et al. |
| 2005/0173260 A1 | 8/2005 | Basol et al. |
| 2005/0178743 A1 | 8/2005 | Manens et al. |

FOREIGN PATENT DOCUMENTS

| | | |
|---|---|---|
| EP | 1 123 956 A1 | 8/2001 |
| JP | 1-241129 A | 9/1989 |
| JP | 2001077117 A1 | 3/2001 |
| WO | WO 00/26443 A2 | 5/2000 |
| WO | WO 00/26443 A3 | 5/2000 |
| WO | WO 00/28586 A2 | 5/2000 |
| WO | WO 00/28586 A3 | 5/2000 |
| WO | WO 00/32356 A1 | 6/2000 |
| WO | WO 00/29008 A2 | 10/2000 |
| WO | WO 00/59008 A3 | 10/2000 |
| WO | WO 00/59682 A1 | 10/2000 |
| WO | WO 02/064314 A1 | 8/2002 |

OTHER PUBLICATIONS

Juchniewicz, R. et al. "Influence of Pulsed Current on Plantinised Titanium and Tantalum Anode Durability," International Congress on Metallic Corrosion, Proceedings—vol. 3, pp. 449–453, Toronto, Jun. 3–7, 1984.

U.S. Appl. No. 09/653,411, filed Aug. 31, 2000, Lee et al.

PCT Written Opinion dated Jun. 10, 2003 for PCT/US02/19495 filed Jun. 20, 2002 (7 pages).

PCT Written Opinion dated Jun. 10, 2003 for PCT/US02/19496 filed Jun. 20, 2002 (8 pages).

PCT International Search Report dated Jul. 10, 2003 for PCT/US03/06373 filed Feb. 28, 2003 (4 pages).

D'Heurle, F.M. and K.C. Park, IBM Technical Disclosure Bulletin, Electrolytic Process for Metal Pattern Generation, vol. 17, No. 1, pp. 271–272, Jun. 1974, XP-002235691, NN 7406271.

Aboaf, J.A. and R.W. Broadie, IBM Technical Disclosure Bulletin, Rounding of Square–Shape Holes in Silicon Wafers, vol. 19, No. 8, p. 3042, Jan. 1977, XP–002235690, NN 77013042.

Bassous, E., IBM Technical Disclosure Bulletin, Low Temperature Methods for Rounding Silicon Nozzles, vol. 20, No. 2, Jul. 1977, pp. 810–811, XP–002235692, NN 7707810.

PCT International Search Report, International Application No. PCT/US02/19495, Mar. 31, 2003.

PCT International Search Report, International Application No. PCT/US02/19496, Apr. 4, 2003.

U.S. Appl. No. 09/651,779, filed Aug. 30, 2000, Moore.

U.S. Appl. No. 09/651,808, filed Aug. 30, 2000, Chopra et al.

U.S. Appl. No. 09/653,392, filed Aug. 31, 2000, Chopra et al.

U.S. Appl. No. 10/090,869, filed Mar. 4, 2002, Moore et al.

U.S. Appl. No. 10/230,463, filed Aug. 29, 2002, Lee et al.

U.S. Appl. No. 10/230,602, filed Aug. 29, 2002, Chopra

U.S. Appl. No. 10/230,628, filed Aug. 29, 2002, Lee et al.

U.S. Appl. No. 10/230,970, filed Aug. 29, 2002, Lee et al.

U.S. Appl. No. 10/230,973, filed Aug. 29, 2002, Lee et al.

Frankenthal, R.P. and Eaton, D.H., "Electroetching of Platinum in the Titanium–Platinum–Gold Metallization on Silicon Integrated Circuits," Journal of The Electrochemical Society, vol. 123, No. 5, pp. 703–706, May 1976, Pennington, New Jersey.

Bernhardt, A.F., Contolini, R.J., Mayer, S.T., "Electrochemical Planarization for Multi–Level Metallization of Microcircuitry," CircuiTree, vol. 8, No. 10, pp. 38, 40, 42, 44, 46, and 48, Oct. 1995.

McGraw–Hill, "Chemical bonding," Concise Encyclopedia of Science & Technology, Fourth Edition, Sybil P. Parker, Editor in Chief, p. 367, McGraw–Hill, New York, New York, 1998.

PhysicsWorld, "Hard Materials", http://physicsweb.org/box/world/11/1/11/world–11–1–11–1 (accessed Jul. 29, 2002), 1 page, excerpt of "Superhard superlattices," S. Barnett and A. Madan, Physics World, Jan. 1998, Institute of Physics Publishing Ltd., Bristol, United Kingdom.

Huang, C.S. et al., "A Novel UV Baking Process to Improve DUV Photoresist Hardness," pp. 135–138, Proceedings of the 1999 International Symposium on VLSI Technology, Systems, and Applications: Proceedings of Technical Papers: Jun. 8–10, 1999, Taipei, Taiwan, Institute of Electrical and Electronics Engineers, Inc., Sep. 1999.

ATMI, Inc., Internal document, adapted from a presentation at the Semicon West '99 Low Dielectric Materials Technology Conference, San Francisco, California, Jul. 12, 1999, pp. 13–25.

Kondo, S. et al., "Abrasive–Free Polishing for Copper Damascene Interconnection," Journal of the Electrochemical Society, vol. 147, No. 10, pp. 3907–3913, The Electrochemical Society, Inc., Pennington, New Jersey, 2000.

Micro Photonics, Inc., CSM Application Bulletin, "Lowload Micro Scratch Tester (MST) for characterisation of thin ploymer films," http://www.microphotonics.com/mstAB-poly.html (accessed Jul. 25, 2002), 3 pages, Irvine, California.

Micro Photonics, Inc., "CSM Nano Hardness Tester," http://www.microphotonics.com/nht.html (accessed Jul. 29, 2002), 6 pages, Irvine, California.

* cited by examiner

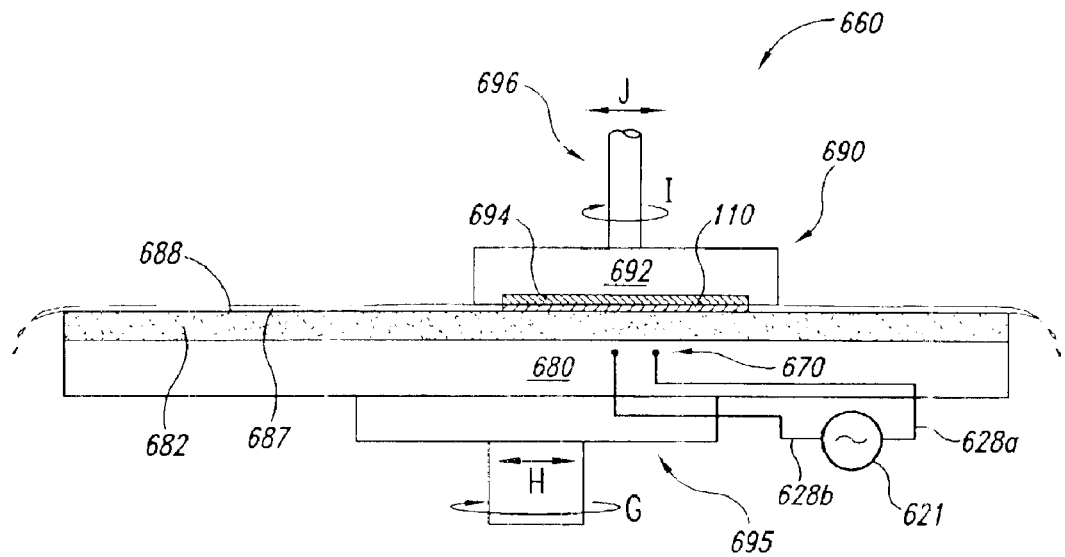
*Fig. 11*
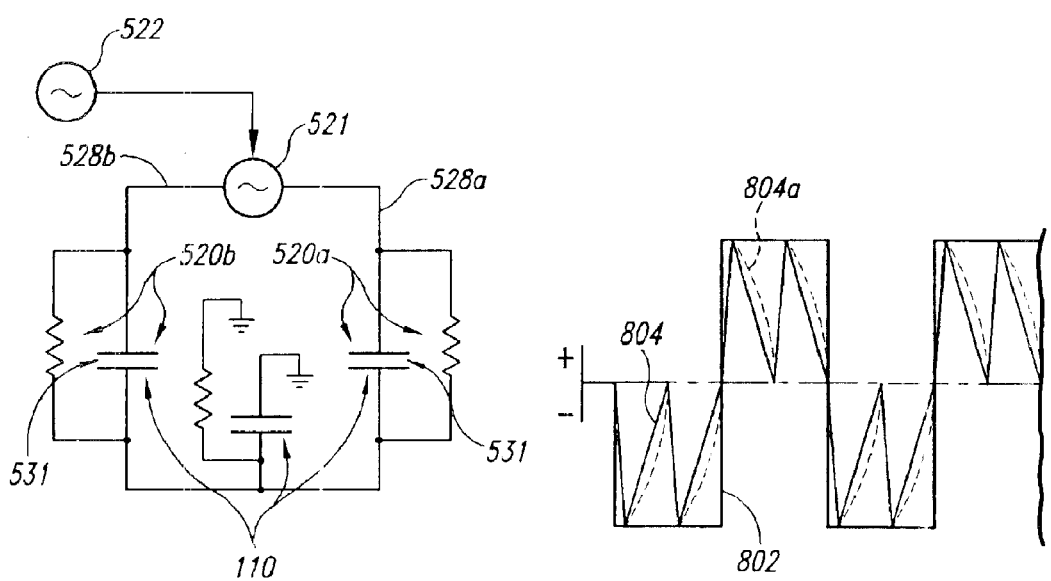
*Fig. 12A*
*Fig. 12B*

METHODS AND APPARATUS FOR ELECTRICALLY DETECTING CHARACTERISTICS OF A MICROELECTRONIC SUBSTRATE AND/OR POLISHING MEDIUM

CROSS-REFERENCE TO RELATED APPLICATIONS

This application is a continuation-in-part of the following pending U.S. Patent Applications, all of which are incorporated herein by reference: Ser. No. 09/651,779, filed Aug. 30, 2000; Ser. No. 09/888,084, filed Jun. 21, 2001; Ser. No. 09/887,767, filed Jun. 21, 2001; and Ser. No. 09/888,002, filed Jun. 21, 2001. Also incorporated herein by reference are the following U.S. Patent Applications, filed simultaneously herewith: Ser. No. 10/230,970 and 10/230,973; Ser. No. 10/230,463; and Ser. No. 10/230,628.

TECHNICAL FIELD

This invention relates to methods and apparatuses for electrically detecting characteristics of microelectronic substrates and/or polishing media for removing material from microelectronic substrates.

BACKGROUND

Microelectronic substrates and substrate assemblies typically include a semiconductor material having features, such as memory cells, that are linked with conductive lines. The conductive lines can be formed by first forming trenches or other recesses in the semiconductor material, and then overlaying a conductive material (such as a metal) in the trenches. The conductive material is then selectively removed to leave conductive lines extending from one feature in the semiconductor material to another.

Electrolytic techniques have been used to both deposit and remove metallic layers from semiconductor substrates. For example, an alternating current can be applied to a conductive layer via an intermediate electrolyte to remove portions of the layer. In one arrangement, shown in FIG. 1, a conventional apparatus 60 includes a first electrode 20a and a second electrode 20b coupled to a current source 21. The first electrode 20a is attached directly to a metallic layer 11 of a semiconductor substrate 10 and the second electrode 20b is at least partially immersed in a liquid electrolyte 31 disposed on the surface of the metallic layer 11 by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11. The alternating current signal can have a variety of wave forms, such as those disclosed by Frankenthal et al. in a publication entitled, "Electroetching of Platinum in the Titanium-Platinum-Gold Metallization on Silicon Integrated Circuits" (Bell Laboratories), incorporated herein in its entirety by reference.

One drawback with the arrangement shown in FIG. 1 is that it may not be possible to remove material from the conductive layer 11 in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11 in contact with the electrolyte 31. However, such inert electrodes may not be as effective as more reactive electrodes at removing the conductive material, and the inert electrodes may still leave residual conductive material on the substrate 10.

FIG. 2 shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10. A further problem with the approaches described above with reference to both FIGS. 1 and 2 is that it may be difficult to accurately determine when the desired amount of material has been removed from the substrate 10.

SUMMARY

The present invention is directed toward methods and apparatuses for detecting characteristics of a microelectronic substrate and/or a polishing medium. A method in accordance with one aspect of the invention includes positioning a microelectronic substrate proximate to and spaced apart from a first electrode and a second electrode, with the first and second electrodes being spaced apart from each other. The microelectronic substrate is contacted with a polishing surface of a polishing medium, and conductive material is removed from the microelectronic substrate by moving at least one of the microelectronic substrate and the electrodes relative to the other while passing a variable electrical signal through the electrodes and at least a portion of the microelectronic substrate. The method can further include detecting a change in the electrical signal corresponding to a change in the amount of conductive material remaining on the microelectronic substrate, and changing a rate at which material is removed from the microelectronic substrate based at least in part on the change in the electrical signal.

In a further aspect of the invention, the method can include ceasing to remove conductive material from the microelectronic substrate when the electrical signal changes by or to a target value. In another aspect of the invention, two signals are transmitted to the microelectronic substrate through the same or different pairs of electrodes, with one electrical signal removing material from the microelectronic substrate, and the other changing in a manner that corresponds to a change in the amount of conductive material remaining on the microelectronic substrate. The two signals can be transmitted simultaneously or sequentially.

In still further aspects of the invention, a characteristic of an electrical signal corresponding to a characteristic of the microelectronic substrate can be detected after contacting the microelectronic substrate with the polishing surface and before removing material from the microelectronic substrate. In yet another aspect of the invention, the electrical signal can pass entirely through the microelectronic substrate from a first surface in contact with the polishing pad to a second surface facing oppositely from the first surface. In still another aspect of the invention, characteristics of the polishing pad can be detected by passing an electrical signal through the electrodes while a polishing surface of the polishing pad is in contact with a generally non-conductive, planar contact member.

Apparatuses in accordance with further aspects of the invention can include a carrier configured to support a microelectronic substrate, a polishing pad proximate to the carrier and having a polishing surface to contact the microelectronic substrate, a first pair of electrodes positioned proximate to the polishing surface, and at least one electrical signal transmitter coupled to the first pair of electrodes to transmit a varying first electrical signal to remove material from the microelectronic substrate. A sensor can be coupled to the first pair of electrodes to detect a characteristic of the first electrical signal. In another embodiment, the sensor can detect a characteristic of a second electrical signal transmitted to the first pair of electrodes or a second pair of electrodes.

BRIEF DESCRIPTION OF THE DRAWINGS

FIG. 11 is a partially schematic, side elevational view of an apparatus for both planarizing and electrolytically processing microelectronic substrates in accordance with still another embodiment of the invention.

FIGS. 12A–B schematically illustrate a circuit and wave form for electrolytically processing a microelectronic substrate in accordance with yet another embodiment of the invention.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3–19 to provide a thorough understanding of these embodiments. One skilled in the art, however, will understand that the present invention may have additional embodiments, and that the invention may be practiced without several of the details described below.

Figure 3:
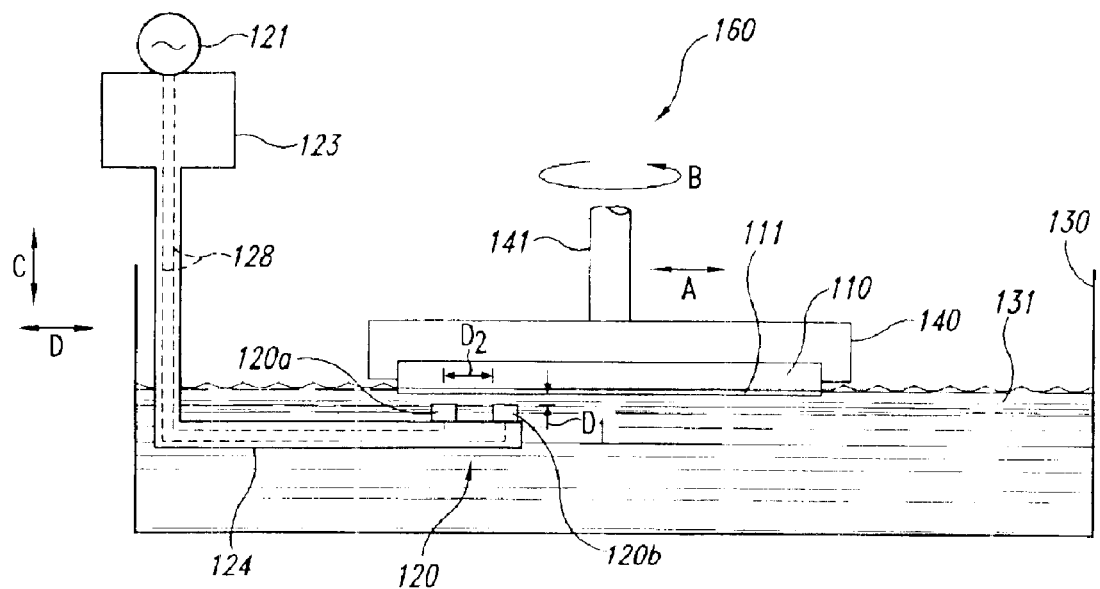
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. A support member 140 supports the microelectronic substrate 110 relative to the vessel 130 so that a conductive layer 111 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support member 124. In one aspect of this embodiment, the support member 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) or other varying current to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1:
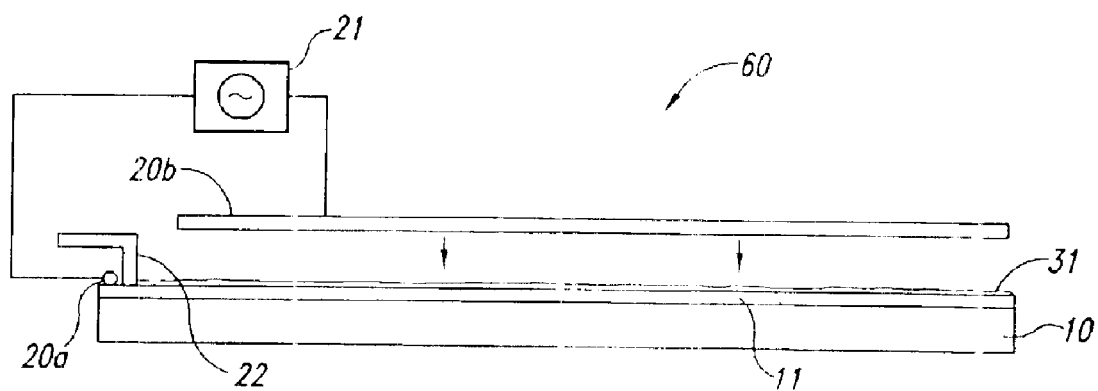
FIG. 1 is a partially schematic, side elevational view of an apparatus for removing conductive material from a semiconductor substrate in accordance with the prior art.
Figure 2:
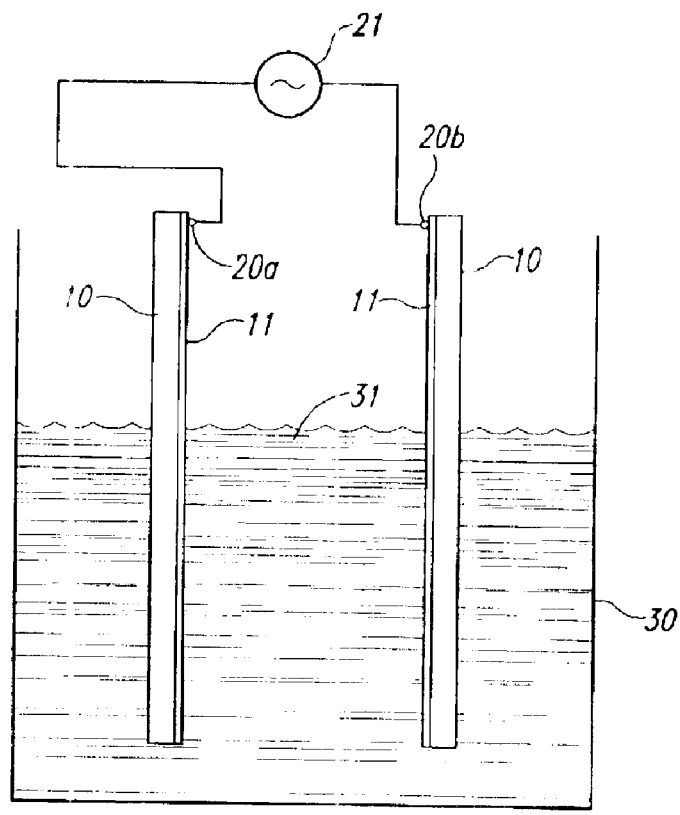
FIG. 2 is a partially schematic side, elevational view of another apparatus for removing conductive material from two semiconductor substrates in accordance with the prior art.

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
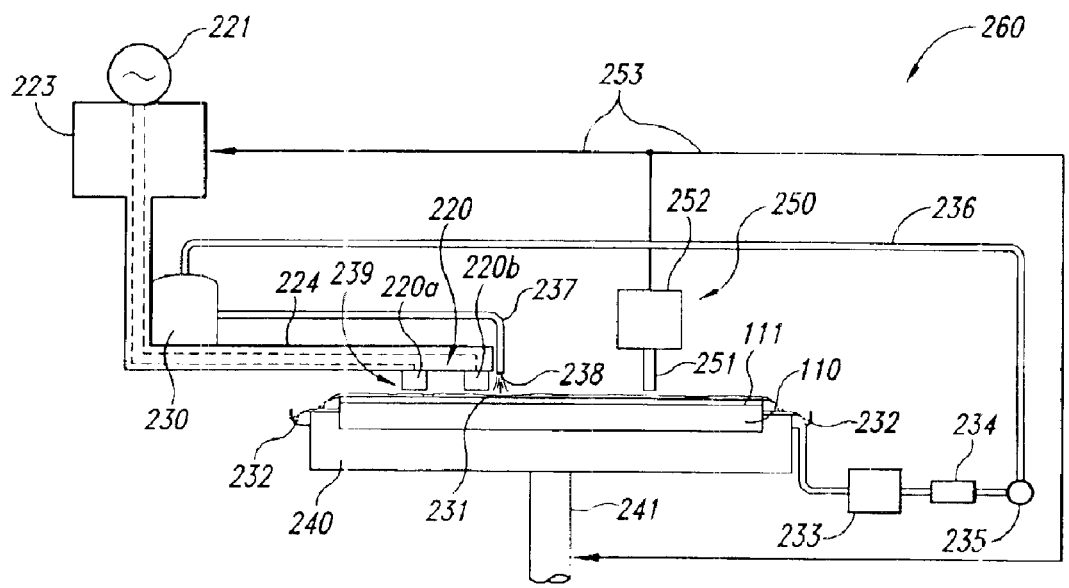
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be deposited locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a pre-determined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed. Aspects of sensor assemblies in accordance with further embodiments of the invention are described below with reference to FIGS. 14–19.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
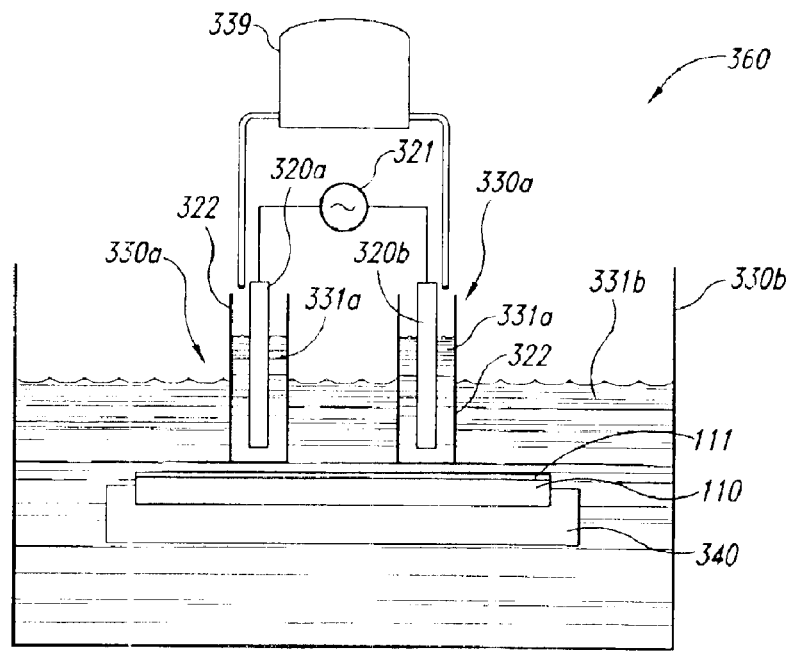
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above with reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
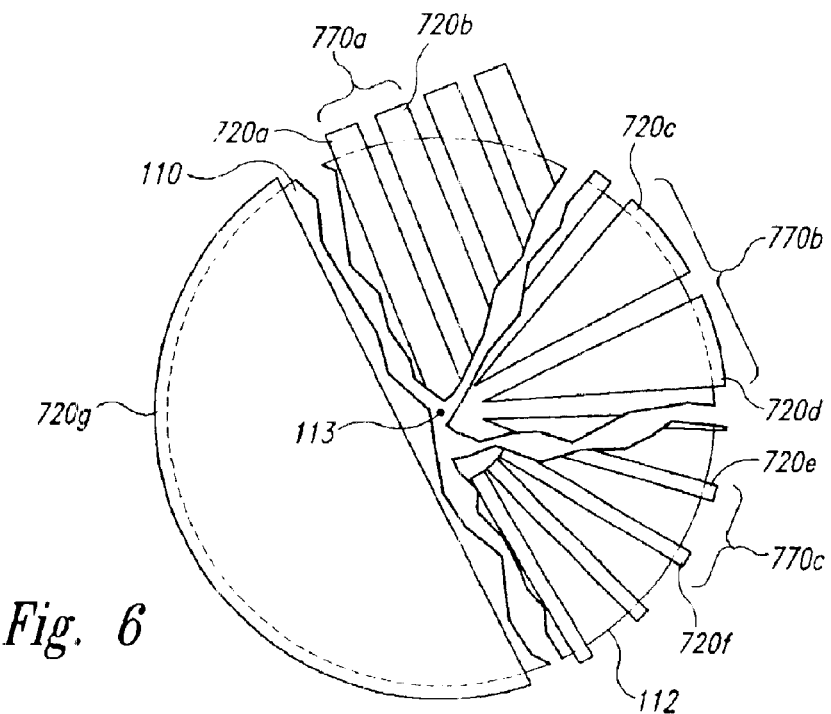
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3–5.

Figure 7:
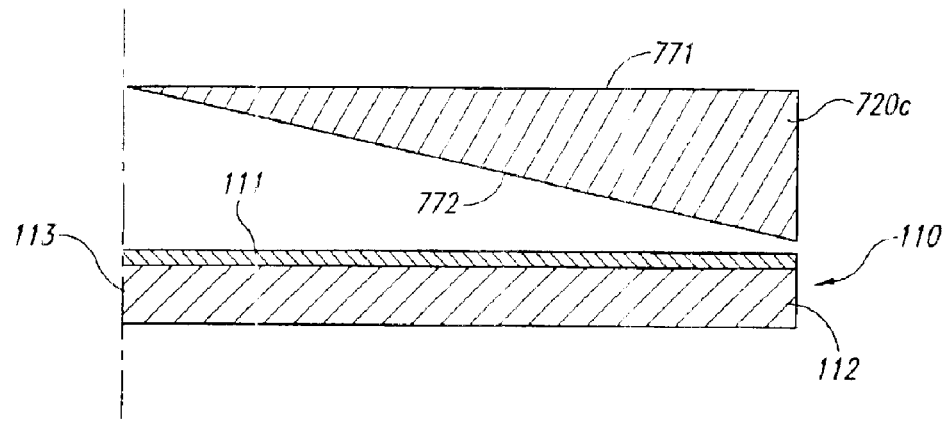
FIG. 7 is a cross-sectional, side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
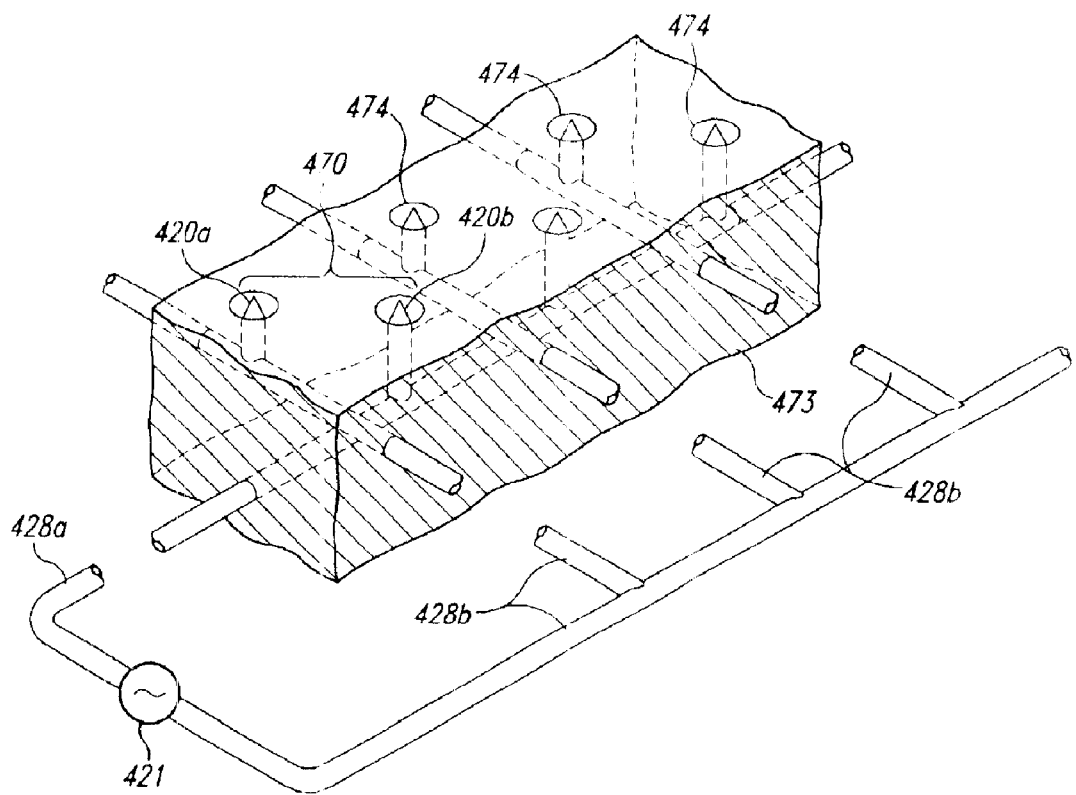
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3–5.

In one aspect of this embodiment, the first lead 428a can be offset from the second lead 428b to reduce the likelihood for short circuits and/or capacitive coupling between the leads. In a further aspect of this embodiment, the electrode support 473 can have a configuration generally similar to any of those described above with reference to FIGS. 1–7. For example, any of the individual electrodes (e.g., 320a, 320c, 320e, or 320g) described above with reference to FIG. 6 can be replaced with an electrode support 473 having the same overall shape and including a plurality of apertures 474, each of which houses one of the first electrodes 420a or the second electrodes 420b.

In still a further aspect of this embodiment, the electrode pairs 470 shown in FIG. 8A can be arranged in a manner that corresponds to the proximity between the electrodes 420a, 420b and the microelectronic substrate 110 (FIG. 7), and/or the electrode pairs 470 can be arranged to correspond to the rate of relative motion between the electrodes 420a, 420b and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420a and the second electrode 420b of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420a and the second electrode 420b. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
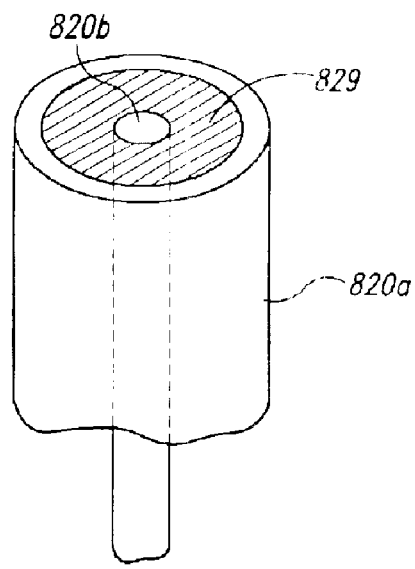
FIGS. 8B–8C are isometric views of electrodes in accordance with still further embodiments of the invention.
Figure 8C:
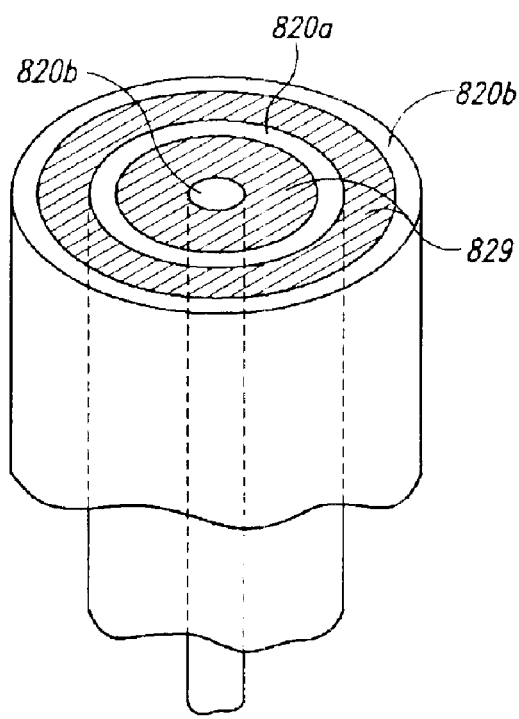

FIGS. 8B–8C illustrate electrodes 820 (shown as first electrodes 820a and second electrodes 820b) arranged concentrically in accordance with still further embodiments of the invention. In one embodiment shown in FIG. 8B, the first electrode 820a can be positioned concentrically around the second electrode 820b, and a dielectric material 829 can be disposed between the first electrode 820a and the second electrode 820b. The first electrode 820a can define a complete 360° arc around the second electrode 820b, as shown in FIG. 8B, or alternatively, the first electrode 820a can define an arc of less than 360°.

In another embodiment, shown in FIG. 8C, the first electrode 820A can be concentrically disposed between two second electrodes 820b, with the dielectric material 829 disposed between neighboring electrodes 820. In one aspect of this embodiment, current can be supplied to each of the second electrodes 820b with no phase shifting. Alternatively, the current supplied to one second electrode 820b can be phase-shifted relative to the current supplied to the other second electrode 820b. In a further aspect of the embodiment, the current supplied to each second electrode 820b can differ in characteristics other than phase, for example, amplitude.

One feature of the electrodes 820 described above with respect to FIGS. 8B–8C is that the first electrode 820a can shield the second electrode(s) 820b from interference from other current sources. For example, the first electrode 820a can be coupled to ground to shield the second electrodes 820b. An advantage of this arrangement is that the current applied to the substrate 110 (FIG. 7) via the electrodes 820 can be more accurately controlled.

Figure 9:
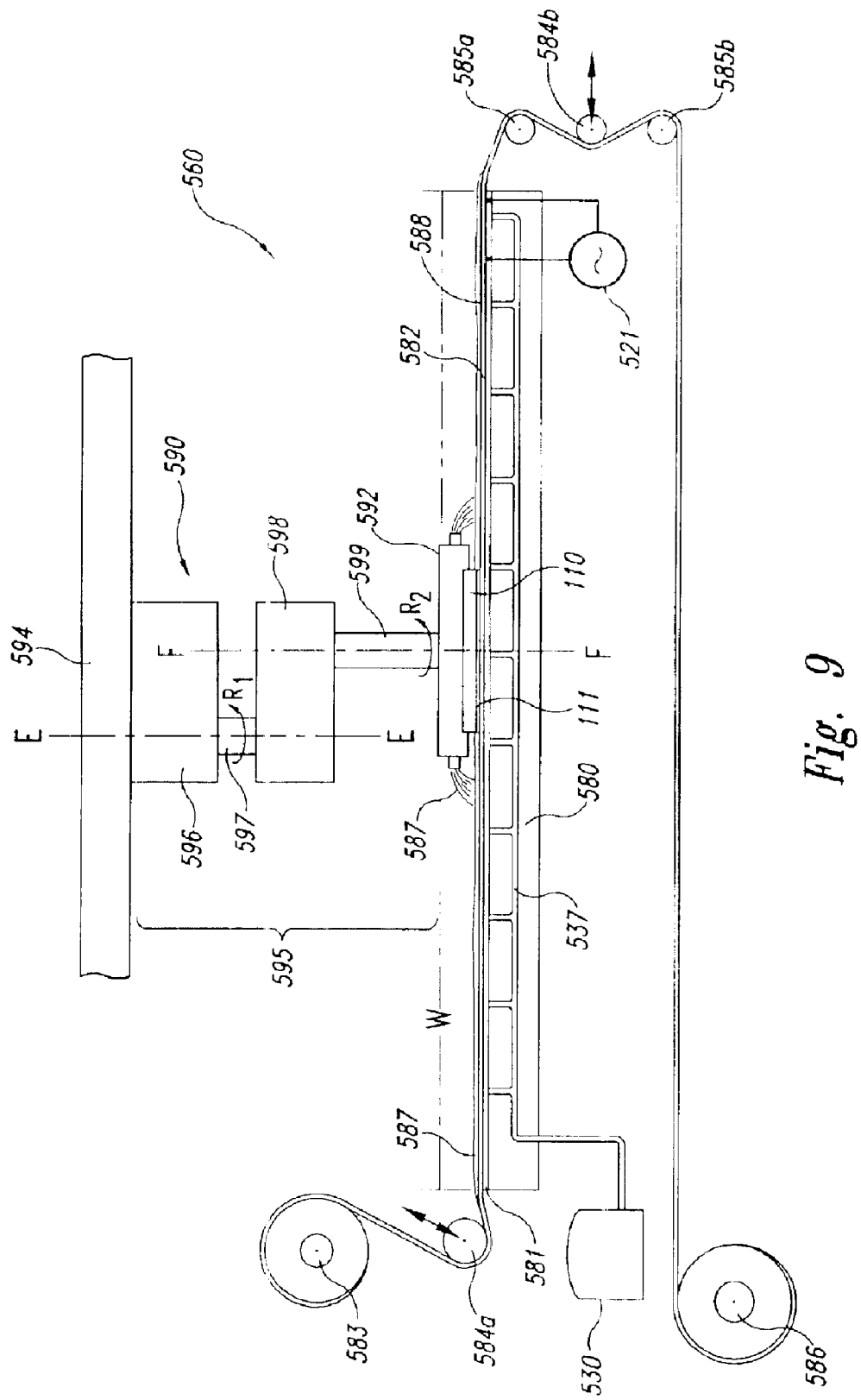
FIG. 9 is a partially schematic, side elevational view of an apparatus for both planarizing and electrolytically processing microelectronic substrates in accordance with yet another embodiment of the invention.

FIG. 9 schematically illustrates an apparatus 560 for both planarizing and electrolytically processing the microelectronic substrate 110 in accordance with an embodiment of the invention. In one aspect of this embodiment, the apparatus 560 has a support table 580 with a top-panel 581 at a workstation where an operative portion "W" of a planarizing pad 582 is positioned. The top-panel 581 is generally a rigid plate to provide a flat, solid surface to which a particular section of the planarizing pad 582 may be secured during planarization.

The apparatus 560 can also have a plurality of rollers to guide, position and hold the planarizing pad 582 over the top-panel 581. The rollers can include a supply roller 583, first and second idler rollers 584a and 584b, first and second guide rollers 585a and 585b, and a take-up roller 586. The supply roller 583 carries an unused or pre-operative portion of the planarizing pad 582, and the take-up roller 583 carries a used or post-operative portion of the planarizing pad 582. Additionally, the first idler roller 584a and the first guide roller 585a can stretch the planarizing pad 582 over the top-panel 581 to hold the planarizing pad 582 stationary during operation. A motor (not shown) drives at least one of the supply roller 583 and the take-up roller 586 to sequentially advance the planarizing pad 582 across the top-panel 581. Accordingly, clean pre-operative sections of the planarizing pad 582 may be quickly substituted for used sections to provide a consistent surface for planarizing and/or cleaning the substrate 110.

The apparatus 560 can also have a carrier assembly 590 that controls and protects the substrate 110 during planarization. The carrier assembly 590 can include a substrate holder 592 to pick up, hold and release the substrate 110 at appropriate stages of the planarizing process. The carrier assembly 590 can also have a support gantry 594 carrying a drive assembly 595 that can translate along the gantry 594. The drive assembly 595 can have an actuator 596, a drive shaft 597 coupled to the actuator 596, and an arm 598 projecting from the drive shaft 597. The arm 598 carries the substrate holder 592 via a terminal shaft 599 such that the drive assembly 595 orbits the substrate holder 592 about an axis E—E (as indicated by arrow "$R_1$"). The terminal shaft 599 may also rotate the substrate holder 592 about its central axis F—F (as indicated by arrow "$R_2$").

The planarizing pad 582 and a planarizing solution 587 define a planarizing medium that mechanically and/or chemically-mechanically removes material from the surface of the substrate 110. The planarizing pad 582 used in the apparatus 560 can be a fixed-abrasive planarizing pad in which abrasive particles are fixedly bonded to a suspension medium. Accordingly, the planarizing solution 587 can be a "clean solution" without abrasive particles because the abrasive particles are fixedly distributed across a planarizing surface 588 of the planarizing pad 582. In other applications, the planarizing pad 582 may be a non-abrasive pad without abrasive particles, and the planarizing solution 587 can be a slurry with abrasive particles and chemicals to remove material from the substrate 110.

To planarize the substrate 110 with the apparatus 560, the carrier assembly 590 presses the substrate 110 against the planarizing surface 588 of the planarizing pad 582 in the presence of the planarizing solution 587. The drive assembly 595 then orbits the substrate holder 592 about the axis E—E and optionally rotates the substrate holder 592 about the axis F—F to translate the substrate 110 across the planarizing surface 588. As a result, the abrasive particles and/or the chemicals in the planarizing medium remove material from the surface of the substrate 110 in a chemical and/or chemical-mechanical planarization (CMP) process. Accordingly, the planarizing pad 582 can smooth the substrate 110 by removing rough features projecting from the conductive layer 111 of the substrate 110.

In a further aspect of this embodiment, the apparatus 560 can include an electrolyte supply vessel 530 that delivers an electrolyte to the planarizing surface of the planarizing pad 582 with a conduit 537, as described in greater detail with reference to FIG. 10. The apparatus 560 can further include a current supply 521 coupled to the support table 580 and/or the top-panel 581 to supply an electrical current to electrodes positioned in the support table 580 and/or the top-panel 581. Accordingly, the apparatus 560 can electrolytically remove material from the conductive layer 111 in a manner similar to that described above with reference to FIGS. 1–8C.

In one aspect of an embodiment of the apparatus 560 described above with reference to FIG. 9, material can be sequentially removed from the conductive layer 111 of the substrate 110 first by an electrolytic process and then by a CMP process. For example, the electrolytic process can remove material from the conductive layer 111 in a manner that roughens the conductive layer 111. After a selected period of electrolytic processing time has elapsed, the electrolytic processing operation can be halted and additional material can be removed via CMP processing. Alternatively, the electrolytic process and the CMP process can be conducted simultaneously. In either of these processing arrangements, one feature of an embodiment of the apparatus 560 described above with reference to FIG. 9 is that the same apparatus 560 can planarize the substrate 110 via CMP and remove material from the substrate 110 via an electrolytic process. An advantage of this arrangement is that the substrate 110 need not be moved from one apparatus to another to undergo both CMP and electrolytic processing.

Another advantage of an embodiment of the apparatus 560 described above with reference to FIG. 9 is that the processes, when used in conjunction with each other, are expected to remove material from the substrate 110 more quickly and accurately than some conventional processes. For example, as described above, the electrolytic process can remove relatively large amounts of material in a manner that roughens the microelectronic substrate 110, and the planarizing process can remove material on a finer scale in a manner that smoothes and/or flattens the microelectronic substrate 110.

Figure 10:
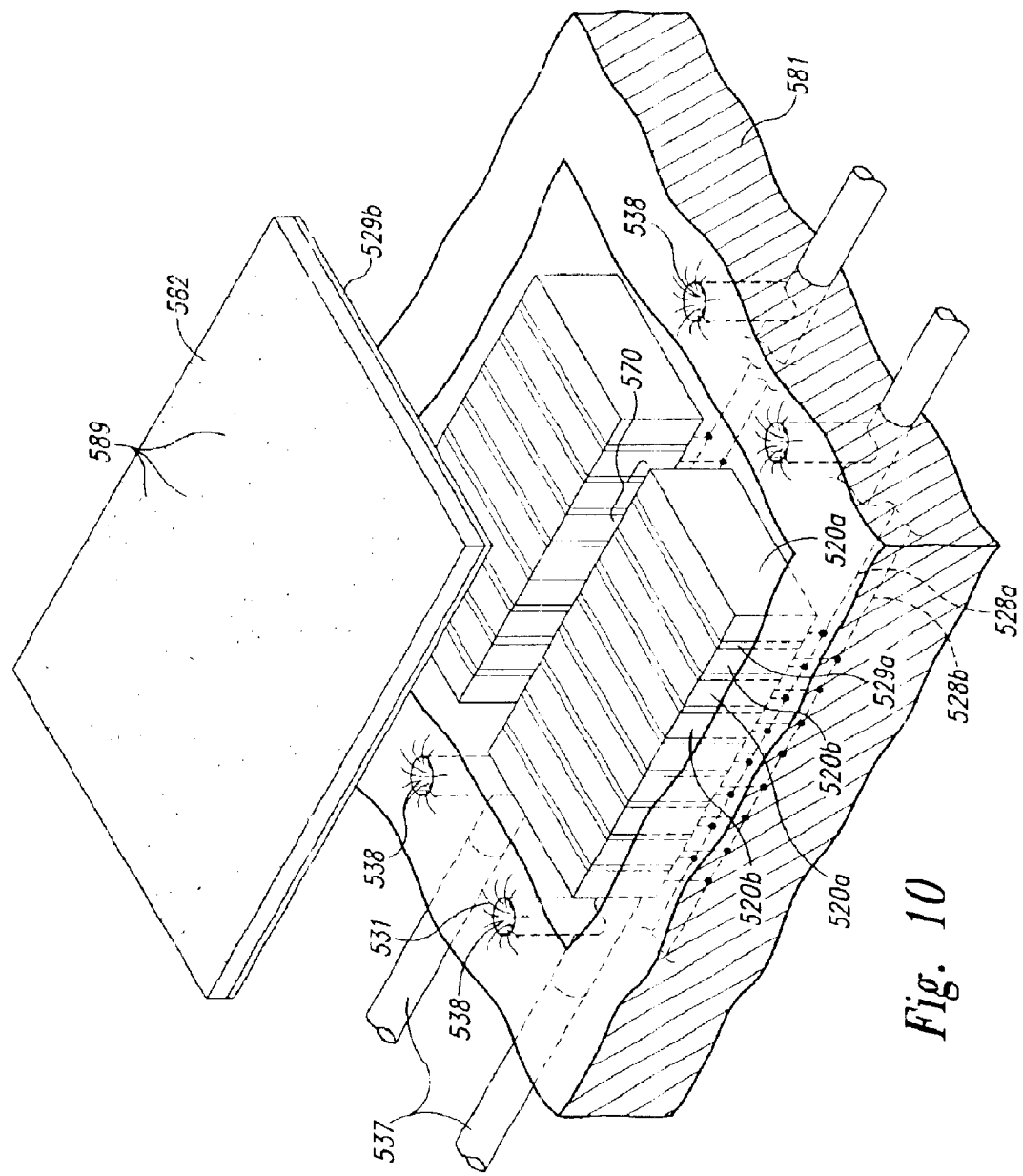
FIG. 10 is a partially schematic, partially exploded isometric view of a planarizing pad and a plurality of electrodes in accordance with still another embodiment of the invention.

FIG. 10 is a partially exploded, partially schematic isometric view of a portion of the apparatus 560 described above with reference to FIG. 9. In one aspect of an embodiment shown in FIG. 10, the top-panel 581 houses a plurality of electrode pairs 570, each of which includes a first electrode 520a and a second electrode 520b. The first electrodes 520a are coupled to a first lead 528a and the second electrodes 520b are coupled to a second lead 528b. The first and second leads 528a and 528b are coupled to the current source 521 (FIG. 9). In one aspect of this embodiment, the first electrode 520a can be separated from the second electrodes 520b by an electrode dielectric layer 529a that includes Teflon™ or another suitable dielectric material. The electrode dielectric layer 529a can accordingly control the volume and dielectric constant of the region between the first and second electrodes 520a and 520b to control electrical coupling between the electrodes.

The electrodes 520a and 520b can be electrically coupled to the microelectronic substrate 110 (FIG. 9) by the planarizing pad 582. In one aspect of this embodiment, the planarizing pad 582 is saturated with an electrolyte 531 supplied by the supply conduits 537 through apertures 538 in the top-panel 581 just beneath the planarizing pad 582. Accordingly, the electrodes 520a and 520b are selected to be compatible with the electrolyte 531. In an alternate arrangement, the electrolyte 531 can be supplied to the planarizing pad 582 from above (for example, by disposing the electrolyte 531 in the planarizing liquid 587) rather than through the top-panel 581. Accordingly, the planarizing pad 582 can include a pad dielectric layer 529b positioned between the planarizing pad 582 and the electrodes 520a and 520b. When the pad dielectric layer 529b is in place, the electrodes 520a and 520b are isolated from physical contact with the electrolyte 531 and can accordingly be selected from materials that are not necessarily compatible with the electrolyte 531.

In either of the embodiments described above with reference to FIG. 10, the planarizing pad 582 can provide several advantages over some conventional electrolytic arrangements. For example, the planarizing pad 582 can uniformly separate the electrodes 520a and 520b from the microelectronic substrate 110 (FIG. 9), which can increase the uniformity with which the electrolytic process removes material from the conductive layer 111 (FIG. 9). The planarizing pad 582 can also have abrasive particles 589 for planarizing the microelectronic substrate 110 in the manner described above with reference to FIG. 9. Furthermore, the planarizing pad 582 can filter carbon or other material that erodes from the electrodes 520a and 520b to prevent the electrode material from contacting the microelectronic substrate 110. Still further, the planarizing pad 582 can act as a sponge to retain the electrolyte 531 in close proximity to the microelectronic substrate 110.

FIG. 11 is a partially schematic, cross-sectional side elevational view of a rotary apparatus 660 for planarizing and/or electrolytically processing the microelectronic substrate 110 in accordance with another embodiment of the invention. In one aspect of this embodiment, the apparatus 660 has a generally circular platen or table 680, a carrier assembly 690, a planarizing pad 682 positioned on the table 680, and a planarizing liquid 687 on the planarizing pad 682. The planarizing pad 682 can be a fixed abrasive planarizing pad or, alternatively, the planarizing liquid 687 can be a slurry having a suspension of abrasive elements and the planarizing pad 682 can be a non-abrasive pad. A drive assembly 695 rotates (arrow "G") and/or reciprocates (arrow "H") the platen 680 to move the planarizing pad 682 during planarization.

The carrier assembly 690 controls and protects the microelectronic substrate 110 during planarization. The carrier assembly 690 typically has a substrate holder 692 with a pad 694 that holds the microelectronic substrate 110 via suction. A drive assembly 696 of the carrier assembly 690 typically rotates and/or translates the substrate holder 692 (arrows "I" and "J," respectively). Alternatively, the substrate holder 692 may include a weighted, free-floating disk (not shown) that slides over the planarizing pad 682.

To planarize the microelectronic substrate 110 with the apparatus 660, the carrier assembly 690 presses the microelectronic substrate 110 against a planarizing surface 688 of the planarizing pad 682. The platen 680 and/or the substrate holder 692 then move relative to one another to translate the microelectronic substrate 110 across the planarizing surface 688. As a result, the abrasive particles in the planarizing pad 682 and/or the chemicals in the planarizing liquid 687 remove material from the surface of the microelectronic substrate 110.

The apparatus 660 can also include a current source 621 coupled with leads 628a and 628b to one or more electrode pairs 670 (one of which is shown in FIG. 11). The electrode pairs 670 can be integrated with the platen 680 in generally the same manner with which the electrodes 520a and 520b (FIG. 10) are integrated with the top panel 581 (FIG. 10). Alternatively, the electrode pairs 670 can be integrated with the planarizing pad 682. In either embodiment, the electrode pairs 670 can include electrodes having shapes and configurations generally similar to any of those described above with reference to FIGS. 3–10 to electrolytically remove conductive material from the microelectronic substrate 110. The electrolytic process can be carried out before, during or after the CMP process, as described above with reference to FIG. 9.

FIG. 12A is a schematic circuit representation of some of the components described above with reference to FIG. 10. The circuit analogy can also apply to any of the arrangements described above with reference to FIGS. 3–11. As shown schematically in FIG. 12A, the current source 521 is coupled to the first electrode 520a and the second electrode 520b with leads 528a and 528b respectively. The electrodes 520a and 520b are coupled to the microelectronic substrate 110 with the electrolyte 531 in an arrangement that can be represented schematically by two sets of parallel capacitors and resistors. A third capacitor and resistor schematically indicates that the microelectronic substrate 110 "floats" relative to ground or another potential.

In one aspect of an embodiment shown in FIG. 12A, the current source 521 can be coupled to an amplitude modulator 522 that modulates the signal produced by the current source 521, as is shown in FIG. 12B. Accordingly, the current source 521 can generate a high-frequency wave 804, and the amplitude modulator 522 can superimpose a low-frequency wave 802 on the high-frequency wave 804. For example, the high-frequency wave 804 can include a series of positive or negative voltage spikes contained within a square wave envelope defined by the low-frequency wave 802. Each spike of the high-frequency wave 804 can have a relatively steep rise time slope to transfer charge through the dielectric to the electrolyte, and a more gradual fall time slope. The fall time slope can define a straight line, as indicated by high-frequency wave 804, or a curved line, as indicated by high-frequency wave 804a. In other embodiments, the high-frequency wave 804 and the low-frequency wave 802 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3–11 and below with reference to FIGS. 13–19 can include an amplitude modulator in addition to a current source.

FIGS. 13–19 schematically illustrate portions of apparatuses having sensors and/or sensor assemblies in accordance with further embodiments of the invention. For purposes of clarity, selected portions of the apparatuses are not shown or are shown in a simplified manner in these Figures to more clearly depict features that correspond closely with the sensing functions provided by the apparatuses. Accordingly, the apparatuses described below with reference to FIGS. 13–19 may have many of the features described above with reference FIGS. 3–12.

Figure 13:
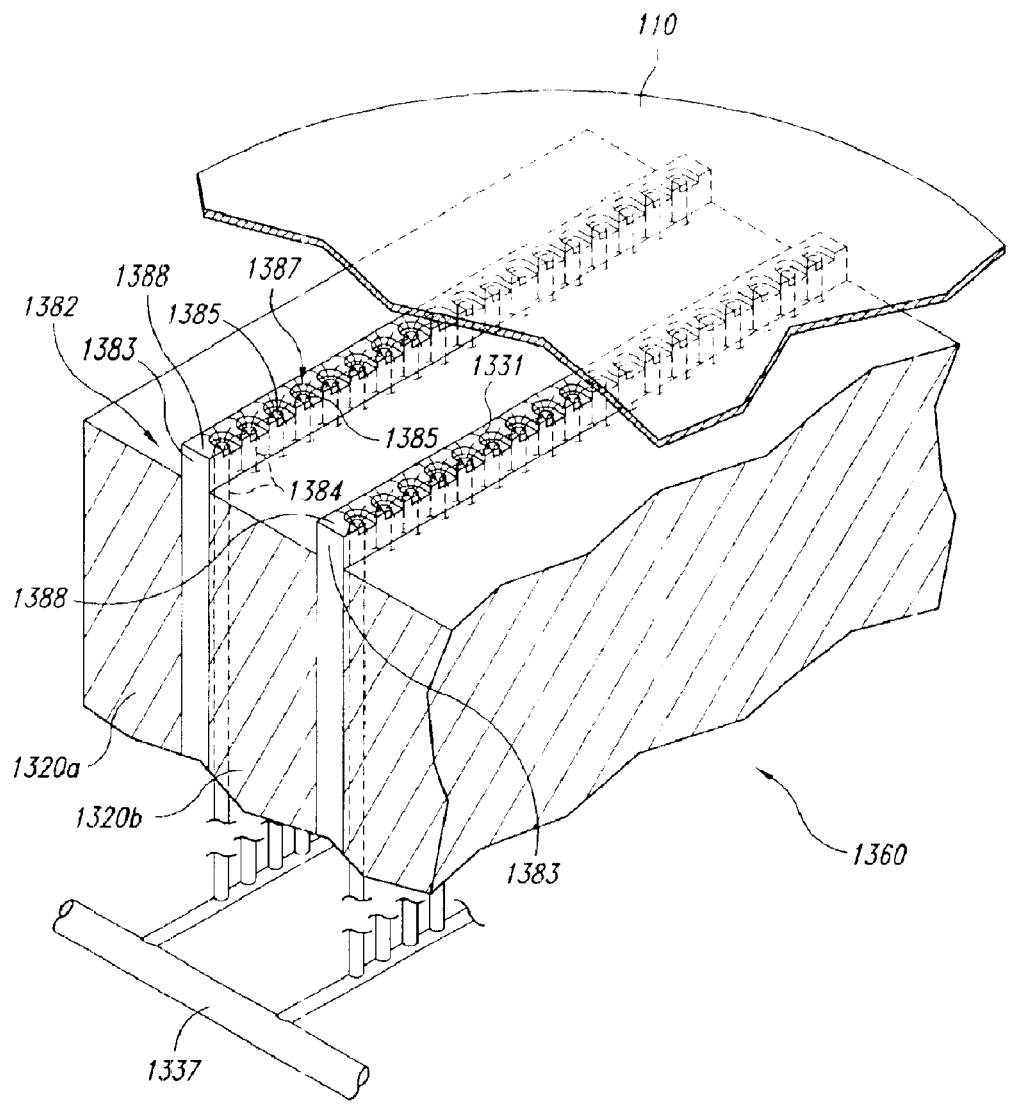
FIG. 13 is a partially cutaway, isometric view of an apparatus for polishing and electrolytically processing microelectronic substrates in accordance with yet another embodiment of the invention.

FIG. 13 is an isometric view of a portion of an apparatus 1360 having electrodes 1320 (shown as a first electrode 1320a and a second electrode 1320b), and a polishing medium 1382 arranged in accordance with an embodiment of the invention. In one aspect of this embodiment, the polishing medium 1382 contains polishing pad portions 1383 that project beyond the electrodes 1320a, 1320b. Each polishing pad portion 1383 can include a polishing surface 1388 and a plurality of flow passages 1384 coupled to a fluid source (not shown in FIG. 13) with a conduit 1337. Each flow passage 1384 can have an aperture 1385 proximate to the polishing surface 1388 to provide an electrolyte 1331 proximate to an interface between the microelectronic substrate 110 and the polishing surfaces 1388. In one aspect of this embodiment, the pad portions 1383 can include recesses 1387 surrounding each aperture 1385. Accordingly, the electrolyte 1331 can proceed outwardly from the flow passages 1384 while the microelectronic substrate 110 is positioned directly overhead, and while the microelectronic substrate 110 remains spaced apart from the electrodes 1320.

Figure 14:
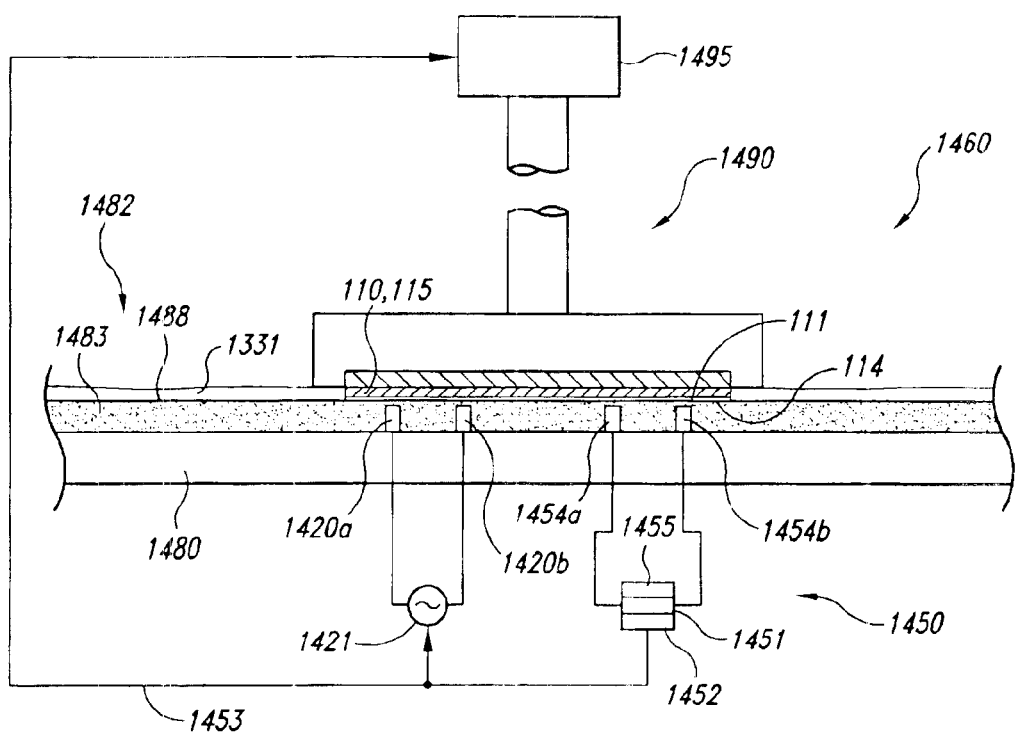
FIG. 14 is a schematic, side elevation view of an apparatus having a polishing medium with electrodes for removing material from a microelectronic substrate, and a sensor for detecting characteristics of the microelectronic substrate and/or the polishing medium in accordance with an embodiment of the invention.

FIG. 14 is a schematic side elevation view of an apparatus 1460 configured to electro-mechanically and/or electrochemically-mechanically remove material from the microelectronic substrate 110 and detect characteristics of the microelectronic substrate 110 in accordance with another embodiment of the invention. In one aspect of this embodiment, the apparatus 1460 includes a platen 1480 that supports a polishing medium 1482. The polishing medium 1482 can include a polishing pad 1483 having a polishing surface 1488 in contact with the microelectronic substrate 110. At least one pair of electrodes 1420 (shown in FIG. 14 is a first electrode 1420a and a second electrode 1420b) are positioned proximate to the polishing surface 1488. In one embodiment, the polishing pad 1483 extends over the electrodes 1420, as shown in FIG. 14 and as described above with reference to FIG. 10. In another embodiment, the electrodes 1420 can be exposed, as described above with reference to FIG. 13. In either embodiment, the pair of electrodes 1420 can be a single pair, or one of a plurality of electrode pairs.

The electrodes 1420 are coupled to a power source 1421. The power source 1421 can provide a first electrical signal to the microelectronic substrate 110 via the electrodes 1420 to electrolytically remove conductive material 111 from a first surface 114 of the microelectronic substrate 110. In one embodiment, the microelectronic substrate 110 is carried in contact with the polishing medium 1482 by a carrier assembly 1490 that includes a carrier drive assembly 1495 for moving the microelectronic substrate 110 relative to the polishing medium 1482. The electrolyte 1331 provides for electrical communication between the electrodes 1420a, 1420b and the conductive material 111. As described above, the electrolyte 1331 can also chemically remove material from the microelectronic substrate 110 and carry the removed material away.

The apparatus 1460 can also include a sensor assembly 1450 configured to transmit a second electrical signal (such as a diagnostic electrical signal) to the microelectronic substrate 110, independent of the first electrical signal transmitted by the power source 1421. In one aspect of this embodiment, the sensor assembly 1450 includes a signal transmitter 1455 that transmits the second electrical signal to a pair of sensor electrodes 1454 (shown as a first sensor electrode 1454a and a second sensor electrode 1454b). The sensor assembly 1450 can further include a sensor 1451 that detects a characteristic of the transmitted signal, and a sensor control unit 1452 that processes the second signal. In a further aspect of this embodiment, the signal transmitter 1455 can include a current source to transmit the second electrical signal at a predetermined level. The sensor 1451 can detect a change in the voltage across the sensor electrodes 1454a, 1454b. This change in voltage can correspond to a change in the impedance of the electrical circuit that includes the electrodes 1454 and the conductive material 111 at the first surface 114 of the microelectronic substrate 110.

In other embodiments, the sensor 1451 is configured to detect other characteristics of the second signal, such as a current or power. For example, the signal transmitter 1455 can transmit a constant voltage signal and the sensor 1451 can detect a change in the current passing between the sensor electrodes 1454a, 1454b caused by a change in the impedance of the layer of conductive material 111.

In any of the foregoing embodiments, the sensor 1451 can detect characteristics of the microelectronic substrate 110 that change as the conductive material 111 is removed from the first surface 114. For example, when a blanket layer of conductive material at the first surface 114 is polished to produce a patterned surface (i.e., a surface having exposed dielectric material surrounding sections of exposed conductive material 111, such as lines and/or vias), the impedance of the conductive path through the conductive material 111 between the sensor electrodes 1454a, 1454b tends to approach an approximately constant level. At this point, the material removal process is typically halted. Accordingly, the sensor assembly 1450 can be used to endpoint the material removal process or selected phases of the material removal process. In other embodiments, the sensor assembly 1450 can be used to monitor the material removal process, for example, to indicate the speed and/or uniformity with which material is removed.

In a further aspect of this embodiment, the sensor assembly 1450 can be coupled to the carrier drive assembly 1495 and/or the power source 1421 with a feedback path 1453. Accordingly, the sensor assembly 1450 can automatically control aspects of the operation of the apparatus 1460 (for example, the motion of the carrier assembly 1490 and/or the power provided by the power source 1421), based on the results obtained by the sensor 1451. In one aspect of this embodiment, the sensor assembly 1450 can direct the power source 1421 to change and/or halt the power provided to the electrodes 1420. In another aspect of this embodiment, the sensor assembly 1450 can direct the carrier drive assembly 1495 to change and/or halt the motion of the carrier assembly 1490. In yet another aspect of this embodiment, halting the motion of the carrier assembly 1490 (and/or the polishing medium 1482) can be delayed for a selected period of time to "over polish" the microelectronic substrate 110. In still another aspect of this embodiment, the sensor assembly 1450 can change the normal force applied by the carrier assembly 1490 to the microelectronic substrate 110. In other aspects of this embodiment, the sensor assembly 1450 can control other operational parameters of the apparatus 1460. For example, the sensor assembly 1450 can be used to control the temperature of the polishing medium 1482, the chemical composition of the electrolyte 1331, and/or a flow rate of the electrolyte 1331.

Figure 15A:
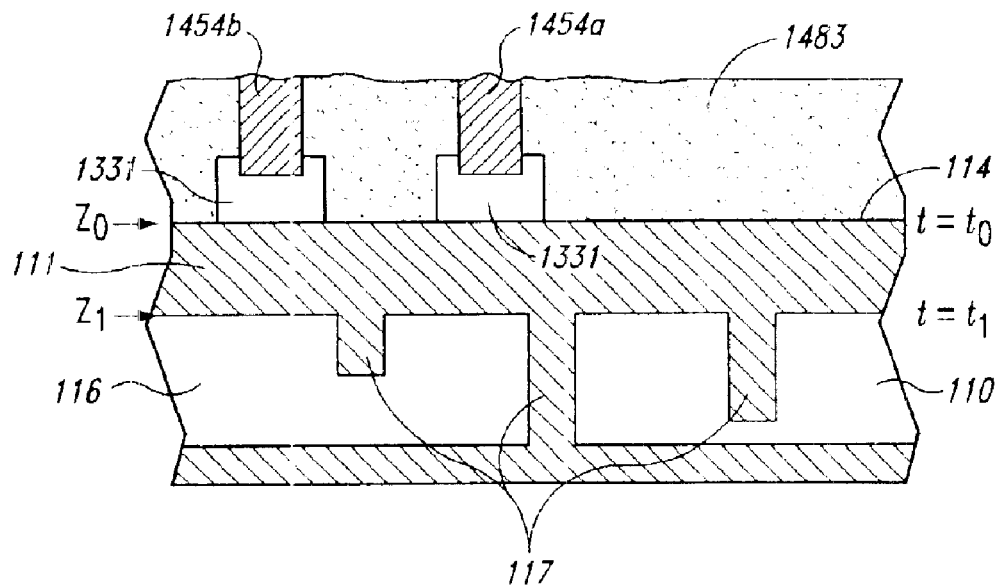
FIG. 15A is a schematic cross-sectional view of a microelectronic substrate having conductive material removed in accordance with an embodiment of the invention.
Figure 15B:
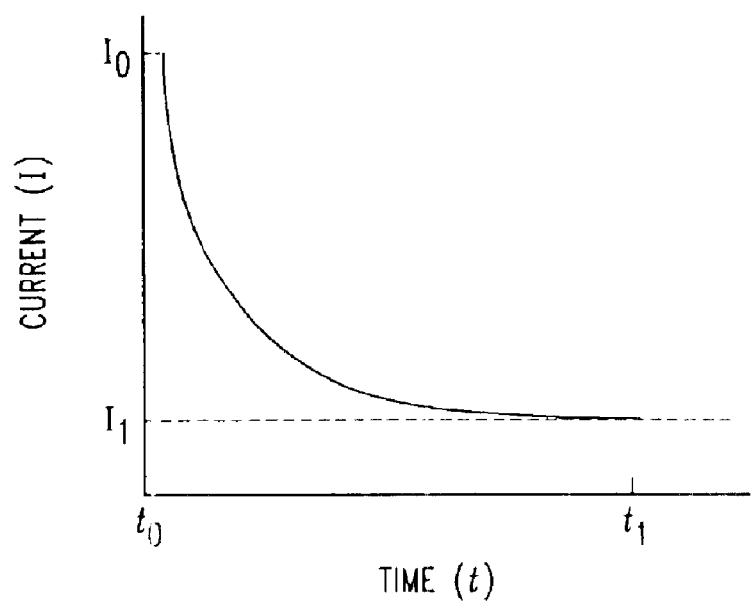
FIG. 15B is a graph illustrating predicted, sensed current as a function of time for a method of detecting remaining conductive material on a microelectronic substrate in accordance with an embodiment of an invention.

FIG. 15A is a partially schematic, side elevational view of a microelectronic substrate 110 processed in accordance with an embodiment of the invention. FIG. 15B illustrates a graph of current sensed by the sensor assembly 1450 as function of time during processing in accordance with an aspect of this embodiment. Referring to FIGS. 15A and 15B together, the microelectronic substrate 110 includes a dielectric material 116 having apertures that are filled with a blanket layer of the conductive material 111. The layer of conductive material 111 has a thickness $Z_0$ (measured at the first surface 114) at time $t=t_0$, resulting in a sensed current through the conductive material 111 of $I_0$. As the conductive material 111 is removed from the first surface 114, the resistance of the conductive material 111 increases and the sensed current decreases. At time $t=t_1$, the underlying dielectric material 116 is exposed and the current approaches and/or reaches a constant level $I_1$, with the conductive material 111 having a thickness $Z_1$. At this point, the material removal process can be halted so as not to remove conductive material from conductive structures 117 (such as lines and vias) formed in the apertures in the dielectric material 116.

In one embodiment, the current or other detected characteristic can change by a selected amount before the rate at which material is removed changes. For example, the current I can change by the difference between $I_0$ and $I_1$. In another embodiment, the current or other detected characteristic can change to a selected value before the rate at which material is removed changes. For example, the material removal rate can change when the current falls to the value $I_1$. In still a further embodiment, the material removal rate can change when the rate of change of the current or other detected characteristic (e.g., the slope of the curve of FIG. 15B) reaches or approaches a selected value. In any of these embodiments, changing the rate of material removal can include ceasing to remove material, as described above. In other aspects of these embodiments, changing the material removal rate can include reducing the material removal rate (e.g., when approaching the endpoint) or increasing the material removal rate (e.g., when the material removal rate is too slow to keep up with the desired process rate).

One feature of an embodiment of the apparatus 1460 described above with reference to FIGS. 14-15B is that the electrical sensor assembly 1450 provides a second or diagnostic electrical signal to determine electrical characteristics of the microelectronic substrate 110. An advantage of this arrangement is that the second signal can be used to determine the endpoint of the material removal process and/or other diagnostic information relevant to the material removal process.

Another feature of an embodiment of the apparatus 1460 described above is that the second electrical signal provided by the sensor assembly 1450 can be independent of the first electrical signal provided by the power source 1421. For example, the first electrical signal can be transmitted to the first pair of electrodes 1420a, 1420b and the second electrical signal can be transmitted to the (separate) second pair of electrodes 1454a, 1454b. An advantage of this feature is that the separated electrode pairs can reduce the likelihood for interference between the first and second electrical signals.

In further embodiments, the apparatus 1460 can be used during phases of microelectronic substrate processing other than endpointing. For example, in one embodiment, the sensor assembly 1450 can be activated prior to removing conductive material 111 from the microelectronic substrate 110 to verify that the conductive material 111 has not already been removed. In one particular aspect of this embodiment, the microelectronic substrate 110 and the sensor electrodes 1454a, 1454b can remain stationary during this process. In another particular aspect of this embodiment, the microelectronic substrate 110 and/or the sensor electrodes 1454a, 1454b can move relative to each other for a brief period of time (for example, one or two seconds) while the carrier assembly 1490 applies a low level of downforce and while the sensor assembly 1450 is activated. Accordingly, the sensor assembly 1450 can detect whether or not the appropriate amount of conductive material 111 has already been removed from the microelectronic substrate 110, and the low downforce can reduce and/or eliminate the likelihood for removing any additional material if the appropriate amount of material has already been removed.

In still a further embodiment, the apparatus 1460 can be used to determine characteristics of features other than the microelectronic substrate 110. For example, the sensor assembly 1450 can be used to detect characteristics of the polishing medium 1482. In one particular embodiment, a nonconductive body 115 having a shape generally similar to that of the microelectronic substrate 110 can be positioned on the polishing medium 1482 while the second signal (and optionally the first signal) is transmitted to the polishing medium 1482. The sensor assembly 1450 can accordingly detect abnormalities in the polishing medium (for example, a short circuit between the sensor electrodes 1454). Such short circuits may be caused by an accumulation of conductive material 111 removed from the microelectronic substrate 110. In other embodiments, the sensor assembly 1450 can be used to detect other characteristics of the polishing medium 1482, the electrodes 1420, 1454 and/or the microelectronic substrate 110.

Figure 16:
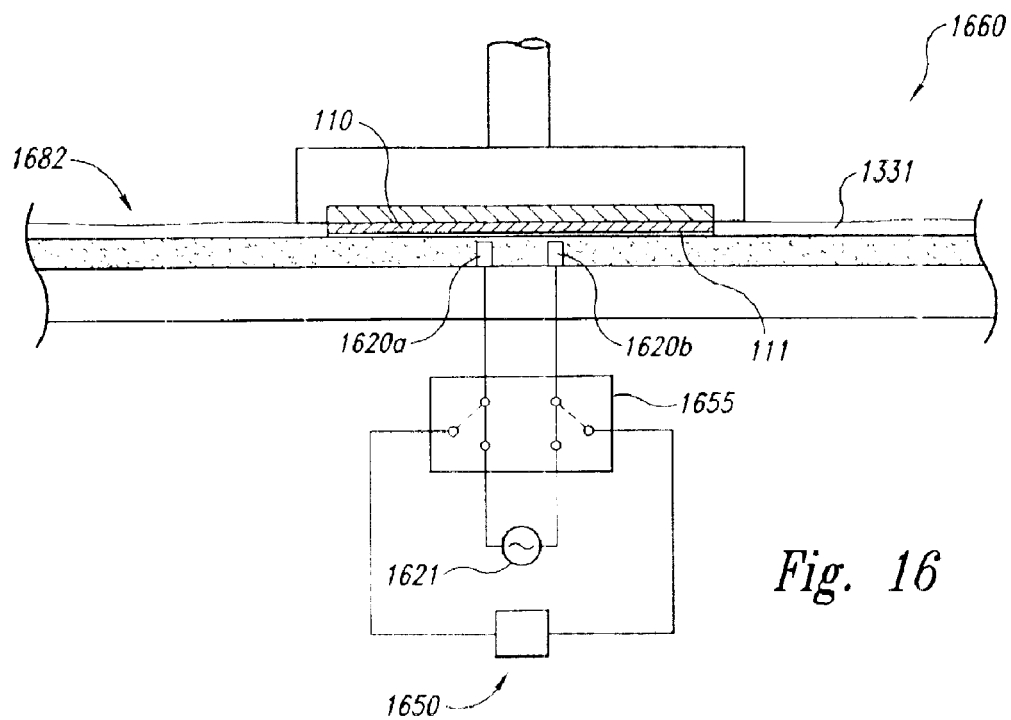
FIG. 16 is a schematic, side elevation view of an apparatus having a polishing medium with electrodes for removing material from a microelectronic substrate, and a sensor for detecting characteristics of the microelectronic substrate and/or the polishing medium in accordance with another embodiment of the invention.

FIG. 16 illustrates an apparatus 1660 configured to provide independent first and second signals to the same pair of electrodes in accordance with another embodiment of the invention. In one aspect of this embodiment, the apparatus 1660 includes a power source 1621 and a sensor assembly 1650 coupled with a switch 1655 to a pair of electrodes 1620 (shown as a first electrode 1620a and a second electrode 1620b). The electrodes 1620 are positioned in a polishing medium 1682 and are electrically coupled to the microelectronic substrate 110 with the electrolyte 1331.

In one aspect of this embodiment, the power source 1621 provides power to the electrodes 1620 via a first electrical signal by placing the switch 1655 in a first position (shown in solid lines in FIG. 16). The first signal provided by the power source 1621 can be selectively interrupted by moving the switch 1655 to a second position (shown in dashed lines in FIG. 16) to couple the electrodes 1620 to the sensor assembly 1650. Accordingly, the sensor assembly 1650 can intermittently direct a second electrical signal (e.g., a diagnostic signal) to the electrodes 1620 to detect a characteristic of the microelectronic substrate 110 and/or the polishing medium 1682. In one aspect of this embodiment, the switch 1655 can automatically move between its first position and its second position with a pre-selected frequency. In another embodiment, an operator can selectively move the switch 1655 between the first position and the second position at any desired time. One feature of both these embodiments is that the same electrodes 1620a, 1620b are used to transmit both the first electrical signal (for removing material from the microelectronic substrate 110) and the second electrical signal (to determine a characteristic of the microelectronic substrate 110 and/or the polishing medium 1682).

Figure 17:
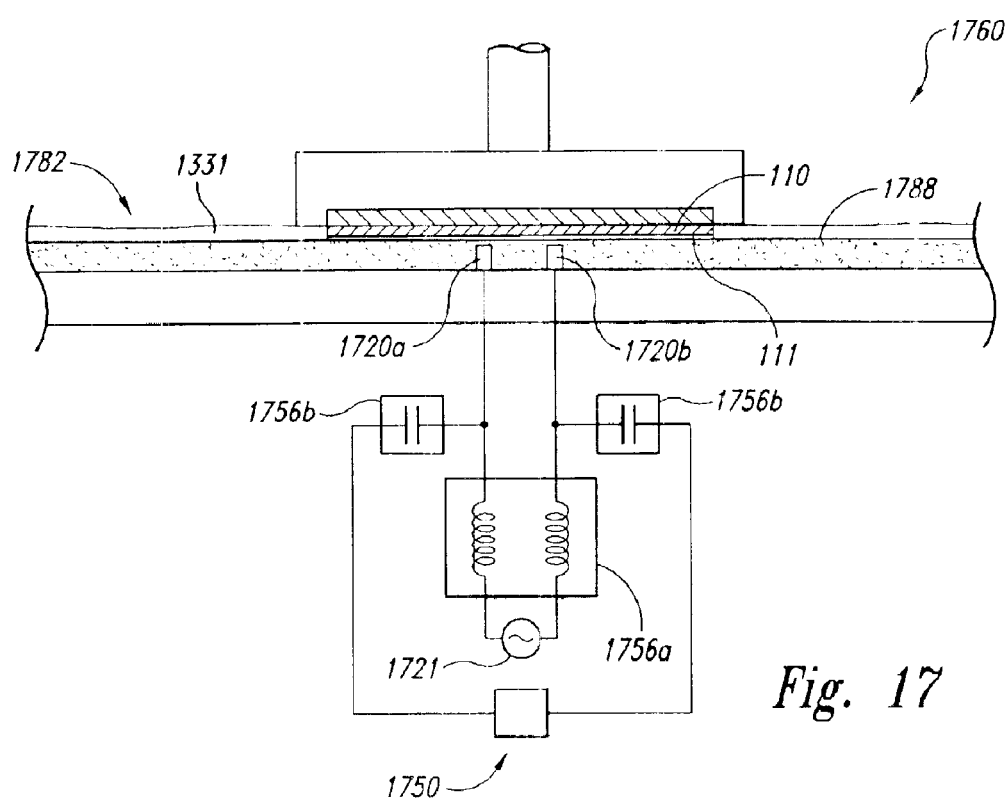
FIG. 17 is a schematic, side elevation view of an apparatus having a polishing medium with electrodes for removing material from a microelectronic substrate, and a sensor for detecting characteristics of the microelectronic substrate and/or the polishing medium in accordance with still another embodiment of the invention.

FIG. 17 is a schematic side elevation view of an apparatus 1760 having a power source 1721 and sensor assembly 1750 configured in accordance with another embodiment of the invention. In one aspect of this embodiment, the sensor assembly 1750 and the power source 1721 are both coupled to the same electrodes 1720 (shown as a first electrode 1720a and a second electrode 1720b). Both the sensor assembly 1750 and the power supply 1721 are configured to provide electrical signals simultaneously to the electrodes 1720. Accordingly, the apparatus 1760 can include a first blocking device 1756a coupled to the power source 1721 to prevent or at least restrict the first electrical signals generated by the power source 1721 from interfering with the second electrical signals provided by the sensor assembly 1750. The apparatus 1750 can further include second blocking devices 1756b coupled to prevent the second signals transmitted by the sensor assembly 1750 from interfering with the first signal transmitted by the power source 1721.

In one aspect of this embodiment, the signals provided by the power source 1721 and the sensor assembly 1750 can be superimposed. For example, the power source 1721 can provide a first electrical signal at a first frequency, and the sensor assembly 1750 can provide a second varying electrical signal at a second frequency different than the first frequency. Accordingly, the blocking devices 1756a, 1756b can include filters configured to selectively pass signals at the first frequency and the second frequency, respectively. In another embodiment, the power source 1721 can provide a varying first electrical signal, and the sensor assembly 1750 can provide a constant (DC) sensor signal on which the first signal is superimposed. In any of these embodiments, the power source 1721 and the sensor assembly 1750 provide first and second signals, respectively, to the electrodes 1720, which are positioned proximate to a polishing surface 1788 of a polishing medium 1782. Accordingly, the apparatus 1760 can both remove material from the microelectronic substrate 110 and detect an amount of conductive material remaining on the microelectronic substrate 110, in a manner generally similar to that described above with reference to FIGS. 14-15B.

Figure 18:
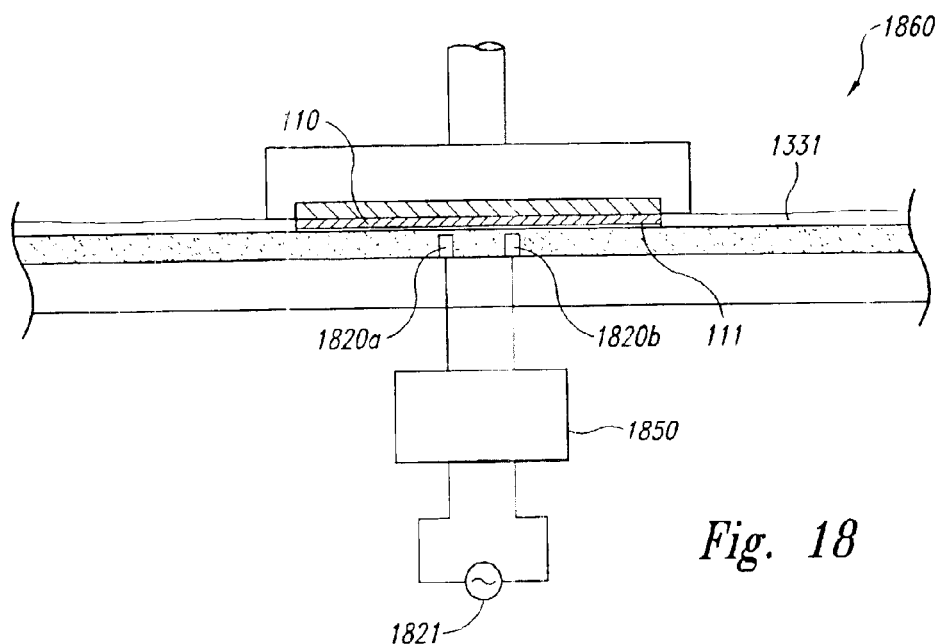
FIG. 18 is a schematic, side elevation view of an apparatus having a polishing medium with electrodes for removing material from the microelectronic substrate, and a sensor for detecting characteristics of the microelectronic substrate and/or the polishing medium in accordance with yet another embodiment of the invention.

FIG. 18 is a schematic illustration of an apparatus 1860 having a sensor assembly 1850 that detects characteristics of an electrical signal provided by a power source 1821 in accordance with another embodiment of the invention. In one aspect of this embodiment, the power source 1821 is coupled to a pair of electrodes 1820 (shown as a first electrode 1820a and a second electrode 1820b) to remove the conductive material 111 from the microelectronic substrate 110. The sensor assembly 1850 detects characteristics of the same electrical signal that is used to remove the conductive material 111 from the microelectronic substrate 110. For example, when the layer of conductive material 111 on the microelectronic substrate 110 is relatively thick, the resistance of the circuit that includes the conductive material 111, the electrodes 1820a, 1820b and the electrolyte 1331 has a relatively low resistance and tends to draw a high level of current from the power source 1821. As the thickness of the conductive material 111 decreases (and its resistance increases), the current drawn from the power source 1821 also tends to decrease, and this decrease can be detected by the sensor assembly 1850.

Figure 19:
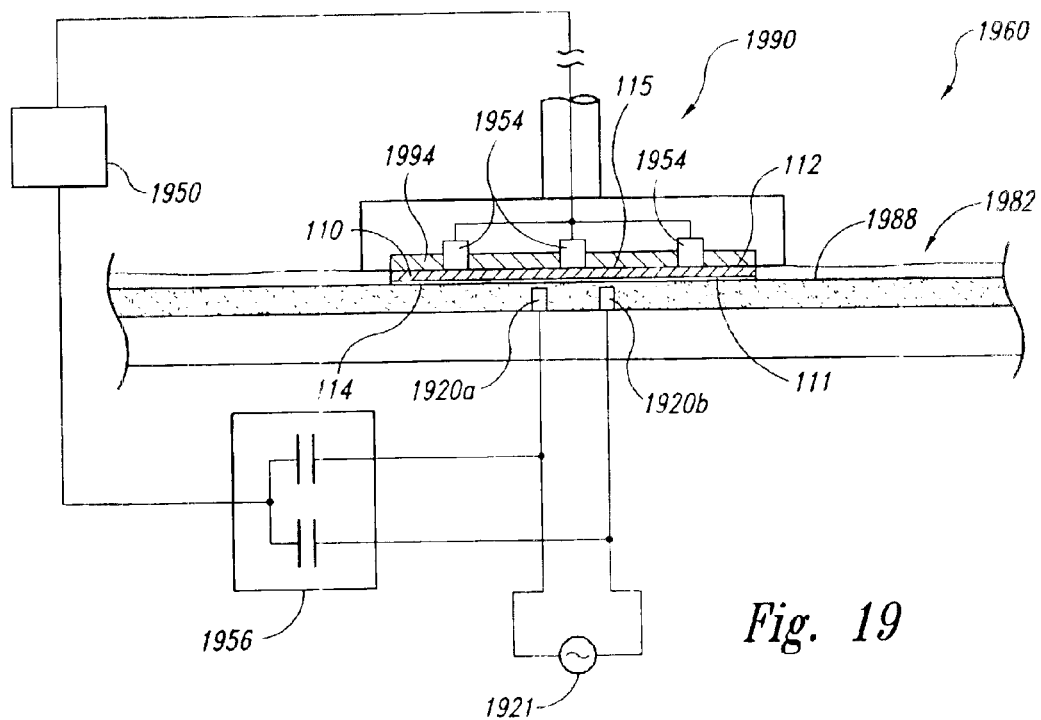
FIG. 19 is a schematic, side elevation view of an apparatus having a polishing medium with electrodes for removing material from a microelectronic substrate, and a sensor for detecting a condition of the microelectronic substrate and/or the polishing medium in accordance with still another embodiment of the invention.

FIG. 19 is a schematic illustration of an apparatus 1960 that passes a diagnostic signal through the microelectronic substrate 110 from the first surface 114 to an oppositely facing second surface 115. In one aspect of this embodiment, the apparatus 1960 includes a pair of electrodes 1920 (shown as a first electrode 1920a and a second electrode 1920b) coupled to a power source 1921 and positioned in or proximate to a polishing medium 1982. The power source 1921 provides the first electrical signal to the electrodes 1920. A carrier assembly 1990 can support the microelectronic substrate 110 with the conductive material 111 at the first surface 114 in contact with a polishing surface 1988 of the polishing medium 1982. A support pad 1994 can be positioned between the second surface 115 of the microelectronic substrate 110 and the carrier assembly 1990.

In one aspect of this embodiment, the support pad 1994 includes apertures through which sensor electrodes 1954 contact the (conductive) second surface 115 of the microelectronic substrate 110. Conductive paths (such as lines and vias) within the microelectronic substrate 1110 electrically couple the second surface 115 to the first surface 114. The sensor electrodes 1954 and the electrode pair 1920 are coupled to a sensor assembly 1950 to provide a complete circuit for the second (diagnostic) electrical signal. In another aspect of this embodiment, a blocking device 1956 provides for partial or complete isolation between the first signal provided by the power source 1921 and the second signal provided by the sensor assembly 1950. Accordingly, the sensor assembly 1950 can transmit and receive sensor signals simultaneously with (and/or sequentially with) signals transmitted by the power source 1921. In another embodiment, the sensor assembly 1950 can detect characteristics of a single signal transmitted to the first surface 114 of the microelectronic substrate 110 (in a manner generally similar to that described above with reference to FIG. 18), and then through the microelectronic substrate 110 to the second surface 115.

In one aspect of at least some of the embodiments described above with reference to FIGS. 4 and 14–19, a single pair of sensor electrodes can be used to detect characteristics of the microelectronic substrate 110. In a further aspect of these embodiments, at least one of the microelectronic substrate 110 and the pair of sensor electrodes can be moved relative to the other to generate a sensor reading that is representative of conditions over a region of the microelectronic substrate 110. For example, the microelectronic substrate 110 can be rotated while the sensor electrodes remain at a fixed location to scan the sensor electrodes over a circumferential band of the microelectronic substrate 110. In another embodiment, the microelectronic substrate can be rotated and translated to scan the sensor electrodes over a wider field. In still further embodiments, the sensor assembly can include multiple electrode pairs configured to simultaneously or sequentially detect the characteristics of the microelectronic substrate at a plurality of locations on the first surface 114.

From the foregoing, it will be appreciated that, although specific embodiments of the invention have been described herein for purposes of illustration, various modifications may be made without deviating from the spirit and scope of the invention. For example, in some embodiments, the microelectronic substrate 110 can be inverted and the polishing medium can be positioned above the microelectronic substrate 110 to contact the conductive material 111. In other embodiments, features shown separately in the Figures can be combined in a single apparatus, and features discussed separately with respect to different processes or process portions can be combined in a single process. Accordingly, the invention is not limited except as by the appended claims.

We claim:

1. A method for detecting electrical characteristics of a microelectronic substrate, comprising:

positioning the microelectronic substrate proximate to and spaced apart from a first electrode and a second electrode, wherein the first and second electrodes are spaced apart from each other;

contacting the microelectronic substrate with a polishing surface of a polishing medium;

removing conductive material from the microelectronic substrate by moving at least one of the microelectronic substrate and the electrodes relative to the other of the microelectronic substrate and the electrodes, while passing a variable first electrical signal through the first and second electrodes and at least a portion of the microelectronic substrate, and while the microelectronic substrate contacts the polishing surface;

passing a second electrical signal through at least part of the microelectronic substrate, the second electrical signal being different than the first electrical signal;

detecting a change in the second electrical signal corresponding to a change in the amount of conductive material remaining on the microelectronic substrate; and changing a rate at which material is removed from the microelectronic substrate based at least in part on the change in the second electrical signal.

2. The method of claim 1, further comprising ceasing to remove conductive material from the microelectronic substrate when a rate of change of an electrical current provided by the second electrical signal is at least approximately constant.

3. The method of claim 1 wherein changing a rate at which material is removed from the microelectronic substrate includes ceasing to remove material from the microelectronic substrate.

4. The method of claim 1 wherein passing the second electrical signal through the microelectronic substrate includes passing the second electrical signal from a first surface of the microelectronic substrate through the microelectronic substrate to a second surface of the microelectronic substrate facing opposite from the first surface.

5. The method of claim 1 wherein passing the second electrical signal through the microelectronic substrate includes passing the second electrical signal from a first surface of the microelectronic substrate through the microelectronic substrate to a second surface of the microelectronic substrate facing opposite from the first surface, then to the second electrode positioned at least proximate to the second surface.

6. The method of claim 1 wherein passing the second electrical signal includes passing the second electrical signal simultaneously with passing the first electrical signal.

7. The method of claim 1 wherein passing the second electrical signal includes passing the second electrical signal after passing the first electrical signal.

8. The method of claim 1 wherein passing the second electrical signal includes passing the second electrical signal from one of the first and second electrodes, through the microelectronic substrate to the other of the first and second electrodes.

9. The method of claim 1, further comprising positioning the microelectronic substrate proximate to and spaced apart from a third electrode and a fourth electrode, wherein the third and fourth electrodes are spaced apart from each other and wherein passing the second electrical signal includes passing the second electrical signal from one of the third and fourth electrodes, through the microelectronic substrate to the other of the third and fourth electrodes.

10. A method for detecting electrical characteristics of a microelectronic substrate, comprising:
positioning the microelectronic substrate proximate to and spaced apart from a first electrode and a second electrode, with the first and second electrodes spaced apart from each other;
removing conductive material from the microelectronic substrate by moving at least one of the microelectronic substrate and the electrodes relative to the other of the microelectronic substrate and the electrodes while passing a variable first electrical signal through the first and second electrodes and at least a portion of the microelectronic substrate;
passing a second electrical signal through the first and second electrodes and at least part of the microelectronic substrate simultaneously with passing the first electrical signal by superimposing the first and second electrical signals; and
detecting a change in the second electrical signal corresponding to a change in the amount of conductive material remaining on the microelectronic substrate.

11. The method of claim 10, further comprising positioning the microelectronic substrate in contact with a polishing surface of a polishing medium while removing the conductive material.

12. The method of claim 10, further comprising changing a rate at which material is removed from the microelectronic substrate based at least in part on the change in the second electrical signal.

13. The method of claim 10, further comprising ceasing to remove material from the microelectronic substrate based at least in part on the change in the second electrical signal.

14. The method of claim 10 wherein superimposing the second electrical signal includes superimposing a variable second electrical signal.

15. The method of claim 10 wherein detecting a change in the second electrical signal includes detecting a change in at least one of a voltage, current and power of the second electrical signal.

16. A method for detecting characteristics of a microelectronic substrate, comprising:
positioning the microelectronic substrate proximate to and spaced apart from a pair of spaced apart electrodes;
contacting the microelectronic substrate with a polishing surface of a polishing medium;
after contacting the microelectronic substrate with the polishing surface and before polishing the microelectronic substrate with the polishing medium, passing a variable electrical signal through the pair of electrodes and the microelectronic substrate while the microelectronic substrate contacts the polishing surface; and
detecting a characteristic of the electrical signal corresponding to a characteristic of the microelectronic substrate.

17. The method of claim 16 wherein the electrical signal is the second of two electrical signals and wherein the method further comprises determining the presence of an exposed conductive layer of the microelectronic substrate based on the characteristic of the second electrical signal and removing at least a portion of the conductive layer by passing the first electrical signal through the electrodes and the conductive layer after passing the second electrical signal.

18. The method of claim 16 wherein the electrical signal is the second of two electrical signals, and wherein the pair of electrodes is the second of two pairs of electrodes, and wherein the method further comprises determining the presence of a conductive layer on the microelectronic substrate based on the characteristic of the second electrical signal passing through the second pair of electrodes and removing at least a portion of the conductive layer by passing the first electrical signal through a first pair of electrodes and through the conductive layer after passing the second electrical signal.

19. The method of claim 16 wherein detecting a characteristic of the electrical signal includes detecting at least one of a current, voltage and power of the electrical signal.

20. The method of claim 16, further comprising moving at least one of the microelectronic substrate and the pair of electrodes relative to the other while passing the electrical signal.

21. The method of claim 16, further comprising fixing the location of the microelectronic substrate relative to the pair of electrodes while passing the electrical signal.

22. A method for detecting electrical characteristics of a polishing pad for microelectronic substrates, comprising:
disposing an electrolytic liquid on the polishing pad;
contacting a polishing surface of the polishing pad with a generally non-conductive surface of a planar contact member;
passing an electrical signal through a first electrode, a second electrode and the electrolytic liquid while the first and second electrodes are positioned at least proximate to the polishing surface, and while the first and second electrodes are spaced apart from each other and the contact member;

determining a characteristic of the electrical signal; and detecting an electrical characteristic of the polishing pad based on the characteristic of the electrical signal.

23. The method of claim 22 wherein detecting a characteristic of the polishing pad includes detecting a presence of a conductive material on or in the polishing pad.

24. The method of claim 22 wherein detecting a characteristic of the polishing pad includes detecting a presence of a conductive material removed from a microelectronic substrate.

25. The method of claim 22 wherein determining a characteristic of the electrical signal includes detecting at least one of a voltage, a current and a power of the electrical signal.

26. An apparatus for removing material from a microelectronic substrate, comprising:

a carrier configured to support a microelectronic substrate;

a polishing pad proximate to the carrier and having a polishing surface to contact the microelectronic substrate, at least one of the polishing pad and the carrier being movable relative to the other;

first and second electrodes positioned proximate to the polishing surface;

at least one electrical signal transmitter coupled to the first and second electrodes, the at least one electrical signal transmitter being configured to transmit first and second electrical signals to the microelectronic substrate via the first and second electrodes, the first signal being a varying signal to remove material from the microelectronic substrate, the second signal being a diagnostic signal; and a sensor coupled to the first and second electrodes and the at least one signal transmitter, the sensor being configured to detect a characteristic of the second signal.

27. The apparatus of claim 26 wherein the first and second electrodes are recessed from the polishing surface.

28. The apparatus of claim 26 wherein the first and second electrodes includes a first electrode pair and wherein the apparatus further comprises a second electrode pair positioned proximate to the polishing surface.

29. The apparatus of claim 26 wherein the polishing pad includes an elongated web.

30. The apparatus of claim 26 wherein the sensor is configured to detect at least one of a voltage, a current and a power.

31. The apparatus of claim 26 wherein the polishing pad is carried by a support the sensor is operatively coupled to at least one of the support and the carrier to control motion of the at least one of the support and the carrier.

32. The apparatus of claim 26 wherein the at least one electrical signal transmitter includes a first signal transmitter configured to transmit the first electrical signal and a second signal transmitter configured to transmit the second electrical signal.

33. The apparatus of claim 26, further comprising third and fourth electrodes, and wherein the at least one signal transmitter includes a first signal transmitter coupled to the first and second electrodes to transmit the first electrical signal, and a second signal transmitter coupled to the third and fourth electrodes to transmit the second electrical signal.

34. An apparatus for removing material from a microelectronic substrate, comprising:

a carrier configured to support a microelectronic substrate;

a polishing pad proximate to the carrier and having a polishing surface to contact the microelectronic substrate, at least one of the polishing pad and the carrier being movable relative to the other;

first and second electrodes positioned at least proximate to the polishing surface;

at least one electrical signal transmitter coupled to the first and second electrodes, the at least one electrical signal transmitter being configured to simultaneously transmit first and second electrical signals to the microelectronic substrate via the first and second electrodes, the first signal being a varying signal to remove material from the microelectronic substrate, the second signal being a diagnostic signal and being superimposed on the first signal; and a sensor coupled to the first and second electrodes and the at least one electrical signal transmitter, the sensor being configured to detect a characteristic of the second signal.

35. The apparatus of claim 34 wherein the first and second electrodes are recessed from the polishing surface.

36. The apparatus of claim 34 wherein the first and second electrodes include a first electrode pair and wherein the apparatus further comprises a second electrode pair positioned proximate to the polishing surface.

37. The apparatus of claim 34 wherein the polishing pad includes an elongated web.

38. The apparatus of claim 34 wherein the polishing pad is carried by a support, and wherein at least one of the support and the carrier is coupled to a drive unit, further wherein the sensor is operatively coupled to the drive unit to control motion of the at least one of the support and the carrier.

* * * * *

UNITED STATES PATENT AND TRADEMARK OFFICE
CERTIFICATE OF CORRECTION

PATENT NO.       : 7,134,934 B2             Page 1 of 1
APPLICATION NO.  : 10/230972
DATED            : November 14, 2006
INVENTOR(S)      : Lee et al.

It is certified that error appears in the above-identified patent and that said Letters Patent is hereby corrected as shown below:

<u>Column 22</u>
Line 14, "detecting characteristics" should be --detecting electrical characteristics--;

Signed and Sealed this

Fourth Day of March, 2008

JON W. DUDAS
*Director of the United States Patent and Trademark Office*